(12) United States Patent
Wang et al.

(10) Patent No.: US 8,265,546 B2
(45) Date of Patent: Sep. 11, 2012

(54) GAIN ADJUSTMENT STEPPING CONTROL IN A WIRELESS REPEATER

(75) Inventors: Michael Mao Wang, San Diego, CA (US); Dhananjay Ashok Gore, San Diego, CA (US); Gwendolyn Denise Barriac, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 274 days.

(21) Appl. No.: 12/722,749

(22) Filed: Mar. 12, 2010

(65) Prior Publication Data

US 2010/0285741 A1    Nov. 11, 2010

Related U.S. Application Data

(60) Provisional application No. 61/177,209, filed on May 11, 2009.

(51) Int. Cl.
 *H04B 3/36* (2006.01)
(52) U.S. Cl. .............. 455/7; 455/9; 455/11.1; 455/13.1; 455/522; 455/69; 370/315; 370/318
(58) Field of Classification Search .................. 455/7, 9, 455/11.1, 13.4, 24, 25, 234.1, 69, 67.11, 455/226.1, 522, 41.2; 370/315, 335, 342, 370/252, 241, 318; 375/142, 211, 213, 267
See application file for complete search history.

(56) References Cited

U.S. PATENT DOCUMENTS

| | | | |
|---|---|---|---|
| 5,115,514 A | 5/1992 | Leslie | |
| 5,930,293 A | 7/1999 | Light et al. | |
| 6,269,165 B1 | 7/2001 | Stott et al. | |
| 7,406,295 B1 | 7/2008 | Yarkosky | |
| 7,424,270 B2 * | 9/2008 | Gaal | .............................. 455/69 |
| 7,480,486 B1 | 1/2009 | Oh et al. | |
| 7,577,398 B2 | 8/2009 | Judd et al. | |
| 7,974,573 B2 | 7/2011 | Dean | |
| 8,010,042 B2 | 8/2011 | Judd et al. | |

(Continued)

FOREIGN PATENT DOCUMENTS

EP    0772310 A2    5/1997

(Continued)

OTHER PUBLICATIONS

International Search Report and Written Opinion—PCT/US2010/034405—International Search Authority, European Patent Office, Feb. 14, 2011.

*Primary Examiner* — Tan Trinh
(74) *Attorney, Agent, or Firm* — Linda G. Gunderson

(57) ABSTRACT

A method for controlling gain in a wireless repeater includes providing one or more gain control metrics where the gain control metrics is indicative of a loop gain of the repeater; measuring the one or more gain control metrics; and adjusting a variable gain of the repeater using a gain adjustment step size being a function of at least the loop gain of the repeater as measured by the one or more gain control metrics. In another embodiment, the gain control algorithm block is configured to divide the loop gain of the repeater into multiple gain adjustment control zones. The gain adjustment control zones may include a first zone having a loop gain in a stable operating region and a second zone having a loop gain outside the stable operating region.

26 Claims, 19 Drawing Sheets

U.S. PATENT DOCUMENTS

| | | |
|---|---|---|
| 8,073,387 B2 | 12/2011 | Maslennikov et al. |
| 2002/0044667 A1* | 4/2002 | Stott et al. ............... 381/93 |
| 2002/0045431 A1* | 4/2002 | Bongfeldt ............. 455/234.1 |
| 2003/0022626 A1 | 1/2003 | Miquel et al. |
| 2004/0166802 A1* | 8/2004 | McKay et al. ............... 455/15 |
| 2005/0058104 A1* | 3/2005 | Yomo et al. ............. 370/335 |
| 2005/0176368 A1* | 8/2005 | Young et al. ............ 455/11.1 |
| 2005/0227619 A1 | 10/2005 | Lee et al. |
| 2006/0003697 A1* | 1/2006 | Asai et al. .............. 455/11.1 |
| 2006/0019603 A1 | 1/2006 | Pergal |
| 2006/0040611 A1 | 2/2006 | Ding et al. |
| 2006/0172781 A1 | 8/2006 | Mohebbi |
| 2006/0205343 A1 | 9/2006 | Runyon et al. |
| 2006/0251156 A1 | 11/2006 | Grant et al. |
| 2007/0147329 A1 | 6/2007 | Soriaga et al. |
| 2007/0155314 A1* | 7/2007 | Mohebbi .................. 455/11.1 |
| 2007/0249283 A1 | 10/2007 | Braithwaite |
| 2008/0113617 A1* | 5/2008 | Braithwaite ................. 455/7 |
| 2008/0176513 A1 | 7/2008 | Braithwaite et al. |
| 2008/0205661 A1 | 8/2008 | Kim et al. |
| 2008/0261519 A1 | 10/2008 | DeMarco et al. |
| 2009/0201153 A1 | 8/2009 | Browning, Jr. et al. |
| 2009/0201421 A1 | 8/2009 | Mawatari et al. |
| 2009/0207776 A1* | 8/2009 | Baik et al. .................. 370/315 |
| 2010/0009625 A1* | 1/2010 | Chami et al. ............. 455/11.1 |
| 2010/0073227 A1 | 3/2010 | Waters et al. |
| 2010/0285733 A1 | 11/2010 | Gore et al. |
| 2010/0285734 A1 | 11/2010 | Black et al. |
| 2010/0285735 A1 | 11/2010 | Gore et al. |
| 2010/0285736 A1 | 11/2010 | Gore et al. |
| 2010/0285737 A1 | 11/2010 | Gore et al. |
| 2010/0285739 A1 | 11/2010 | Wang et al. |
| 2010/0285740 A1 | 11/2010 | Wang et al. |
| 2010/0285742 A1 | 11/2010 | Wang et al. |
| 2010/0285744 A1 | 11/2010 | Wang et al. |
| 2010/0316092 A1 | 12/2010 | Hannan et al. |
| 2011/0117834 A1* | 5/2011 | Martin ........................ 455/7 |
| 2011/0223853 A1 | 9/2011 | Wang et al. |

FOREIGN PATENT DOCUMENTS

| | | |
|---|---|---|
| EP | 1748578 | 1/2007 |
| EP | 1931063 A2 | 6/2008 |
| WO | WO2008109570 A2 | 9/2008 |
| WO | WO2008109571 A2 | 9/2008 |
| WO | WO2009020326 A1 | 2/2009 |
| WO | WO2010132473 | 11/2010 |

* cited by examiner

GAIN ADJUSTMENT STEPPING CONTROL IN A WIRELESS REPEATER

CROSS-REFERENCE TO RELATED APPLICATIONS

This application claims the benefit of U.S. Provisional Patent Application Ser. No. 61/177,209, filed on May 11, 2009, which application is incorporated herein by reference in its entirety.

This application is related to the following concurrently filed and commonly assigned U.S. patent applications: application Ser. No. 12/722,714, entitled "Gain Control Optimizing SINR and Data Rate For Wireless Repeater"; application Ser. No. 12/722,722, entitled "Multi-Metric Gain Control For Wireless Repeater"; application Ser. No. 12/722,730, entitled "Stability Indicator For A Wireless Repeater"; application Ser. No. 12/722,733, entitled "Gain Control Metric Computation In A Wireless Repeater"; and application Ser. No. 12/722,760, entitled "Gain Control Metric Pruning In A Wireless Repeater". The applications are incorporated herein by reference in their entireties.

BACKGROUND

1. Field

This disclosure generally relates to repeaters in wireless communication systems.

2. Background

Wireless communication systems and techniques have become an important part of the way we communicate. However, providing coverage can be a significant challenge to wireless service providers. One way to extend coverage is to deploy repeaters.

In general, a repeater is a device that receives a signal, amplifies the signal, and transmits the amplified signal. FIG. 1 shows a basic diagram of a repeater 110, in the context of a cellular telephone system. Repeater 110 includes a donor antenna 115 as an example network interface to network infrastructure such as a base station 125. Repeater 110 also includes a server antenna 120 (also referred to as a "coverage antenna") as a mobile interface to mobile device 130. In operation, donor antenna 115 is in communication with base station 125, while server antenna 120 is in communication with mobile devices 130.

In repeater 110, signals from base station 125 are amplified using forward link circuitry 135, while signals from mobile device 130 are amplified using reverse link circuitry 140. Many configurations may be used for forward link circuitry 135 and reverse link circuitry 140.

There are many types of repeaters. In some repeaters, both the network and mobile interfaces are wireless; while in others, a wired network interface is used. Some repeaters receive signals with a first carrier frequency and transmit amplified signals with a second different carrier frequency, while others receive and transmit signals using the same carrier frequency. For "same frequency" repeaters, one particular challenge is managing the feedback that occurs since some of the transmitted signal can leak back to the receive circuitry and be amplified and transmitted again.

Existing repeaters manage feedback using a number of techniques; for example, the repeater is configured to provide physical isolation between the two antennae, filters are used, or other techniques may be employed.

SUMMARY

Systems, apparatuses, and methods disclosed herein allow for enhanced repeater capability. In one embodiment, a method for controlling gain in a wireless repeater includes receiving an input signal at a receiving antenna of the repeater where the input signal is a sum of a remote signal to be repeated and a feedback signal resulting from a feedback channel between the receiving antenna and a transmitting antenna; transmitting an output signal on the transmitting antenna where the output signal is an amplified input signal; providing one or more gain control metrics where the gain control metrics is indicative of a loop gain of the repeater; measuring the one or more gain control metrics; and adjusting a variable gain of the repeater using a gain adjustment step size being a function of at least the loop gain of the repeater as measured by the one or more gain control metrics.

In another embodiment, a wireless repeater having a receiving antenna for receiving an input signal and a transmitting antenna for transmitting an output signal is described. The input signal is a sum of a remote signal to be repeated and a feedback signal resulting from a feedback channel between the receiving antenna and the transmitting antenna and the output signal is an amplified input signal. The repeater includes a gain control block configured to control a variable gain value of the repeater based on one or more gain control metrics where the gain control metrics is indicative of a loop gain of the repeater. The gain control block includes a gain metric calculator configured to generate the one or more gain control metrics and a gain control algorithm block configured to control the variable gain of the repeater based on multiple gain control metrics. The gain control algorithm block is configured to adjust the variable gain of the repeater using a gain adjustment step size being a function of at least the loop gain of the repeater as measured by the one or more gain control metrics.

In other embodiment, the gain control algorithm block is configured to divide the loop gain of the repeater into multiple gain adjustment control zones. The gain adjustment control zones may include a first zone having a loop gain in a stable operating region and a second zone having a loop gain outside the stable operating region. The gain control algorithm block is configured to provide one or more gain adjustment control curves in each of the gain adjustment control zones. The one or more gain adjustment control curves may be provided in the first zone to increase the variable gain of the repeater, and the one or more gain adjustment control curves may be provided in the second zone to decrease the variable gain of the repeater.

Furthermore, in one embodiment, the gain control algorithm block is configured to determine the gain adjustment control zone the repeater is being operated in using the one or more gain control metrics, and adjust the variable gain of the repeater using a gain adjustment step size associated with the one or more gain adjustment control curves associated with the selected one of the gain adjustment control zones.

DETAILED DESCRIPTION

Figure 1:
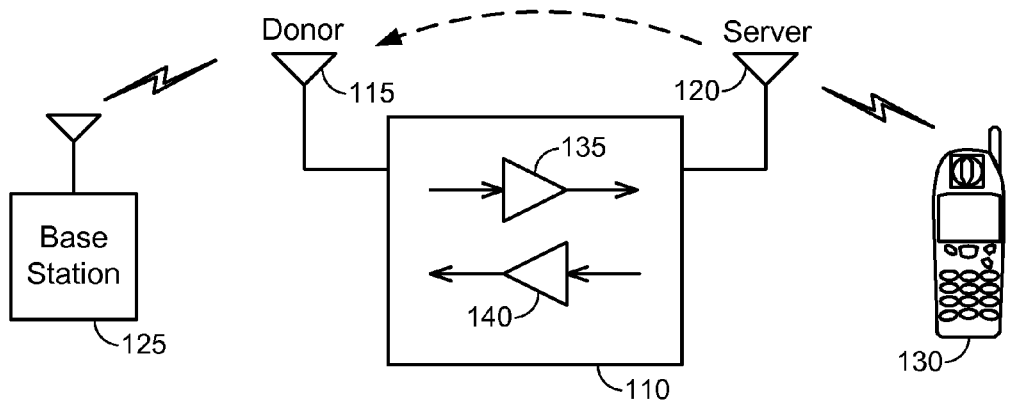
FIG. 1 is a simplified diagram of a repeater according to the prior art.

The nature, objectives, and advantages of the disclosed method and apparatus will become more apparent to those skilled in the art after considering the following detailed description in connection with the accompanying drawings.

Prior art repeaters such as those described above may provide significant advantages for cellular telephone or similar networks. However, existing repeater configurations may not be suitable for some applications. For example, existing repeater configurations may not be suitable for indoor coverage applications (e.g., repeating signals for a residence or business environment) which may be more difficult to obtain the desired isolation between the repeater's antennas. Moreover, in some traditional repeater implementations, the target is to achieve as high a gain as reasonable while maintaining a stable feedback loop (loop gain less than unity). However, increasing the repeater gain renders isolation more difficult due to the increased signal leaking back into the donor antenna. In general, loop stability demands require that the signal leaking back into the donor antenna from the coverage antenna be much lower than the remote signal (the signal to be repeated). The maximum achievable signal to interference/noise ratio (SINR) at the output of the repeater is then the same as the SINR of the remote signal at the input to the repeater. High gain and improved isolation form two demands required for modern day repeaters, especially those for indoor applications.

Systems and techniques herein provide for wireless repeaters with improved isolation between the repeaters' donor antenna ("the receiving antenna" for the example of a forward link transmission) and the coverage antenna ("the transmitting antenna" for forward link transmissions). Furthermore, in some embodiments, systems and techniques herein provide for a unique repeater design employing interference cancellation or echo cancellation to significantly improve the isolation. In some embodiments, the interference cancellation and echo cancellation are realized using improved channel estimation techniques provided herein for accurate estimation of the channel. Effective echo cancellation requires very accurate channel estimation of the leakage channel. In general, the more accurate the channel estimate, the higher the cancellation and hence the higher the effective isolation. Herein, "interference cancellation" or "echo cancellation" refers to techniques that reduce or eliminate the amount of leakage signal between repeater antennas; that is, "interference cancellation" refers to cancellation of an estimated leakage signal, which provides for partial or complete cancellation of the actual leakage signal.

According to another aspect of the present invention, systems and techniques herein provide for a unique wireless repeater design employing gain control techniques for enhancing the stability of the repeater system. In some embodiments, a metric for measuring the stability of the repeater system is provided. The gain of the repeater is controlled based on the value of the metric as an indicator of stability. For example, in the event of large signal dynamics; a metric, such as the loop gain, becomes degraded and the gain will be reduced to keep the repeater system stable. The gain control methods and systems can be advantageously applied to repeaters employing interference cancellation or repeaters not employing interference cancellation.

Lastly, according to yet another aspect of the present invention, systems and techniques herein provide for improving wireless repeater performance in a multi-repeater environment. In some embodiments, systems and techniques that facilitate inter-repeater communication are provided. In other embodiments, systems and techniques for suppressing interference and reducing delay spread from neighboring repeaters are provided.

Figure 2:
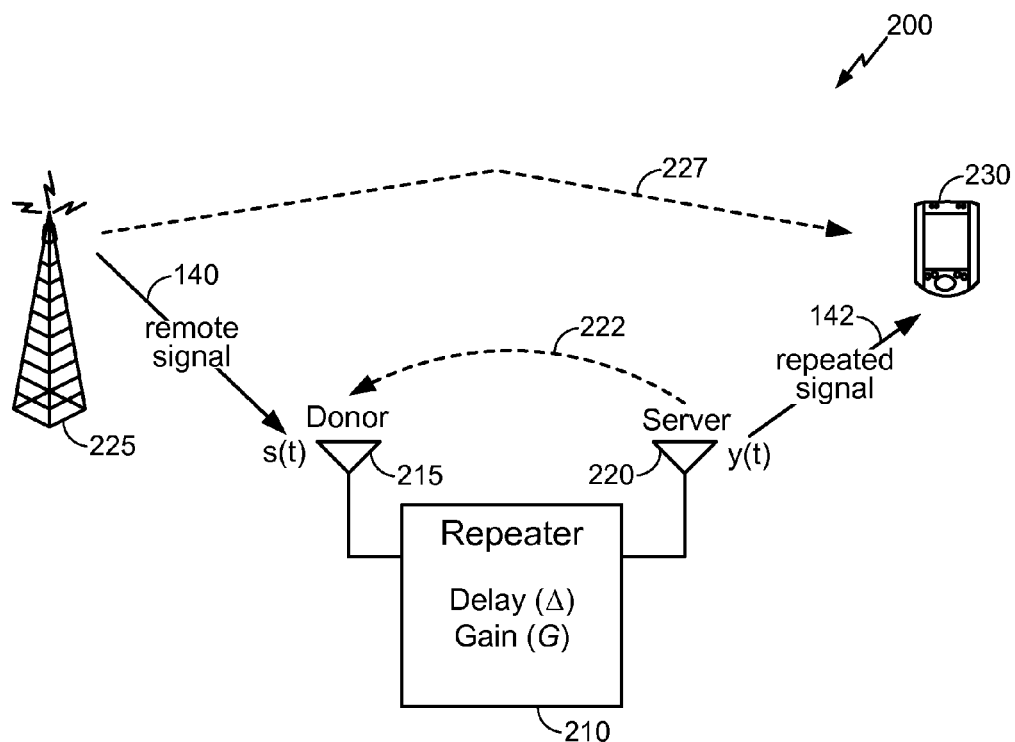
FIG. 2 shows a diagram of a repeater environment according to some embodiments of the current disclosure.

FIG. 2 shows a diagram of an operating environment 200 for a repeater 210 according to embodiments of the current disclosure. The example of FIG. 2 illustrates forward link transmissions; i.e., a remote signal 140 from a base station 225 is intended for a mobile device 230. A repeater, such as repeater 210, may be used in environment 200 if an unrepeated signal along the path 227 between base station 225 and mobile device 230 would not provide sufficient signal for effective voice and/or data communications received at mobile device 230. Repeater 210 with a gain G and a delay Δ is configured to repeat a signal received from base station 225 on a donor antenna 215 to mobile device 230 using a server antenna 220. Repeater 210 includes forward link circuitry for amplifying and transmitting signals received from the base station 225 to mobile device 230 through donor antenna 215 and server antenna 220. Repeater 210 may also include reverse link circuitry for amplifying and transmitting signals from mobile device 230 back to base station 225. At repeater 210, the remote signal s(t) is received as an input signal and the remote signal s(t) is repeated as a repeated or amplified signal y(t) where $y(t)=\sqrt{G}s(t-\Delta)$. Ideally, the gain G would be large, the inherent delay Δ of the repeater would be small, the input SINR would be maintained at the output of repeater 210 (this can be of particular importance for data traffic support), and only desired carriers would be amplified.

In practice, the gain of repeater 210 is limited by the isolation between donor antenna 215 and server antenna 220. If the gain is too large, the repeater can become unstable due to signal leakage. Signal leakage refers to the phenomenon where a portion of the signal that is transmitted from one antenna (in FIG. 2, server antenna 220) is received by the other antenna (in FIG. 2, donor antenna 215), as shown by the feedback path 222 in FIG. 2. In other words, signal leakage is a result of the transmitted signal not being totally blocked by antenna isolation between the receiving and transmitting antennas. Without interference cancellation or other techniques, the repeater would amplify this feedback signal, also referred to as the leakage signal, as part of its normal operation, and the amplified feedback signal would again be transmitted by server antenna 220. The repeated transmission of the amplified feedback signal due to signal leakage and high repeater gain can lead to repeater instability. Additionally, signal processing in repeater 210 has an inherent non-negligible delay A. The output SINR of the repeater is dependent on RF non-linearities and other signal processing. Thus, the aforementioned ideal repeater operational characteristics are often not attained. Finally, in practice, the desired carriers can vary depending on the operating environment or market in which the repeater is deployed. It is not always possible to provide a repeater that amplifies only the desired carriers.

In embodiments of the current disclosure, a repeater suitable for indoor coverage (e.g., business, residential, or similar use) is provided. The repeater has an active gain of about 70 dB or greater which is an example of a sufficient gain for coverage in a moderately sized residence. Furthermore, the repeater has a loop gain of less than one for stability (loop gain being referred to as the gain of the feedback loop between the transmitting antenna and the receiving antenna) and a sufficient amount of margin for stability and low output noise floor. In some embodiments, the repeater has a total isolation of greater than 80 dB. In some embodiments, the repeater employs interference/echo cancellation to achieve a high level of active isolation, which is significantly more challenging than the requirements of available repeaters.

Some techniques of the current disclosure utilize channel estimation to enable the required level of echo cancellation. By estimating the feedback channel (the channel between the antennas) to a sufficient degree of accuracy, the residual error, post echo cancellation, can be sufficiently below the remote signal to realize the desired loop gain margin for stability.

The communication system in which the repeater of the present invention can be deployed includes various wireless communication networks based on infrared, radio, and/or microwave technology. Such networks can include, for example, a wireless wide area network (WWAN), a wireless local area network (WLAN), a wireless personal area network (WPAN), and so on. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as CDMA2000, Wideband-CDMA (W-CDMA), and so on. CDMA2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). CDMA2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The systems and techniques described herein may also be used for any combination of WWAN, WLAN and/or WPAN.

Gain Control Techniques

According to embodiments of the present invention, gain control techniques for establishing the optimal gain value for a repeater are described. The gain control techniques described herein apply to repeaters implementing echo cancellation or repeaters not implementing echo cancellation. To keep repeater operation stable, control of the loop gain of the repeater is critical. The loop gain of the repeater may change suddenly because of sudden changes in the signal levels in the channel. Methods to stabilize the repeater system in the presence of large signal dynamics are desired.

In one embodiment, a gain control metric is established as an indicator of the stability of the repeater. The gain control metric is monitored and when the metric degrades, the gain of the repeater is decreased to maintain the stability of the repeater. In operation, the gain control metric is monitored continuously and the gain of the repeater is adjusted up and down to output as high a gain as possible while at the same time to maintain system stability and required output SINR.

1. Repeater Gain Control Optimizing SINR and Data Rate

In traditional repeater implementations, the target is to achieve as high a gain as possible while ensuring that the feedback loop remains stable (loop gain less than unity). High gain level provides maximum possible coverage area. Loop stability demands require that the signal leaking back into the donor antenna from the coverage antenna is typically much lower than the remote signal (the signal to be repeated). The maximum achievable SINR at the output of the repeater is then the same as the SINR of the remote signal at the input to the repeater.

The repeater gain may be increased significantly through the use of interference cancellation techniques. With these techniques, the signal leaking back from the coverage antenna into the donor antenna is treated as interference and cancelled through baseband techniques, thereby allowing higher repeater gain to be used. Higher repeater gain is very desirable since it increases the coverage area of the repeater. In some cases, when the gain is high, the signal leaking into the donor antenna from the coverage antenna can be significantly larger than the remote signal. However, RF distortions, such as due to quantization, at the receiver are dependent on the received signal. In the case where the feedback signal is significantly larger than the remote signal, the large feedback signal introduces a noise floor to the remote signal. In other words, a large feedback signal introduces a floor on the achievable SINR at the coverage antenna output even if the interference cancellation works ideally, i.e. even if the entire feedback signal is cancelled. Thus, even if the SINR of the remote signal (depending on RF conditions where the repeater is deployed) is very large, the SINR at the output of the repeater is limited by the error floor introduced at the repeater input.

Figure 3:
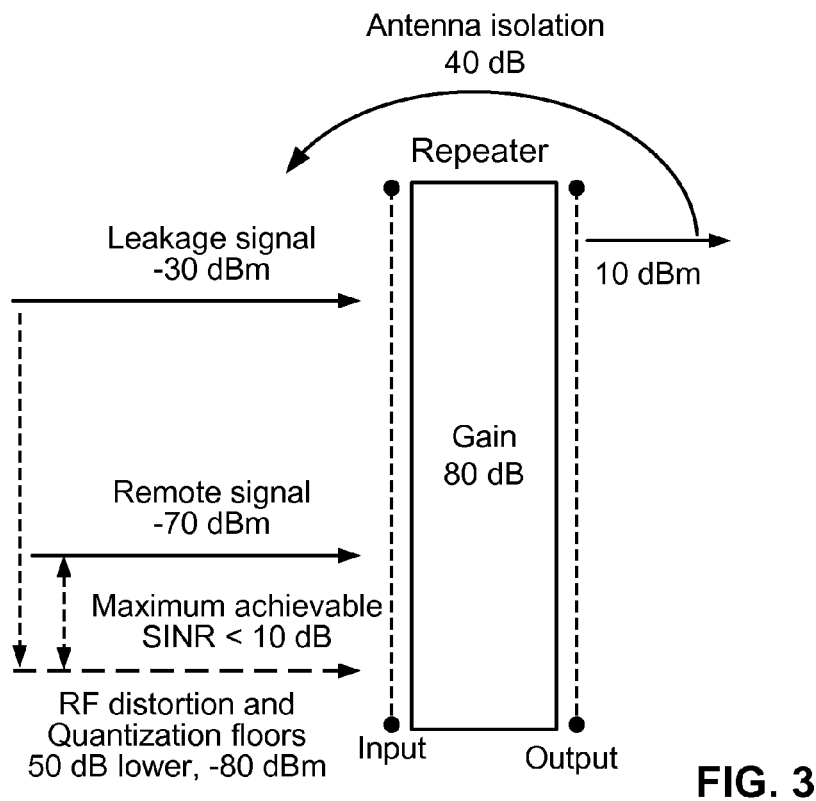
FIG. 3 illustrates the effect of feedback signal on the noise floor at the repeater input.

FIG. 3 illustrates the effect of feedback signal on the noise floor at the repeater input. In the present illustration, the repeater gain is 80 dB. Assuming that the remote signal is at −70 dB, the output signal is therefore at 10 dB. Further assuming that the antenna isolation between the transmitting and receiving antennas is 40 dB, the feedback signal from the transmitting antenna to the receiving antenna will therefore be at −30 dB. When the RF distortions/quantization floor is 50 dB lower than the feedback signal, the noise floor will therefore be at −80 dB which introduces a SINR floor of 10 dB only. That is, the noise floor is only 10 dB lower than the remote signal. The low SINR is a problem when the repeater supports wireless data usage. The large repeater gain implies that the coverage area will be large but the cap on the achievable SINR implies a cap on the maximum achievable data rate through this repeater. Depending on the usage requirements (e.g., high data rates) of the device communicating through this repeater, the limitation on the data rate may not be acceptable.

According to one aspect of the present invention, a method to control the repeater gain in a wireless repeater adjusts the repeater gain based on the output signal-to-interference/noise ratio (SINR) and the data rate requirements. In one embodiment, the input SINR is used an indicator of the output SINR and as a measure of the noise floor and the repeater gain is adjusted up (increased) or down (decreased) as a function of the desired noise tolerance and the desired data rate. In other words, the gain and the SINR of the repeater are traded off to optimize the desired coverage area versus data rate. For instance, when more noise or a lower SINR can be tolerated, a higher repeater gain setting is used to realize a larger coverage area at the expense of a lower data rate due to the lower SINR. On the other hand, when less noise or a higher SINR is desired, a lower repeater gain setting is used which reduces the coverage area but increases the data rate.

Figure 4:
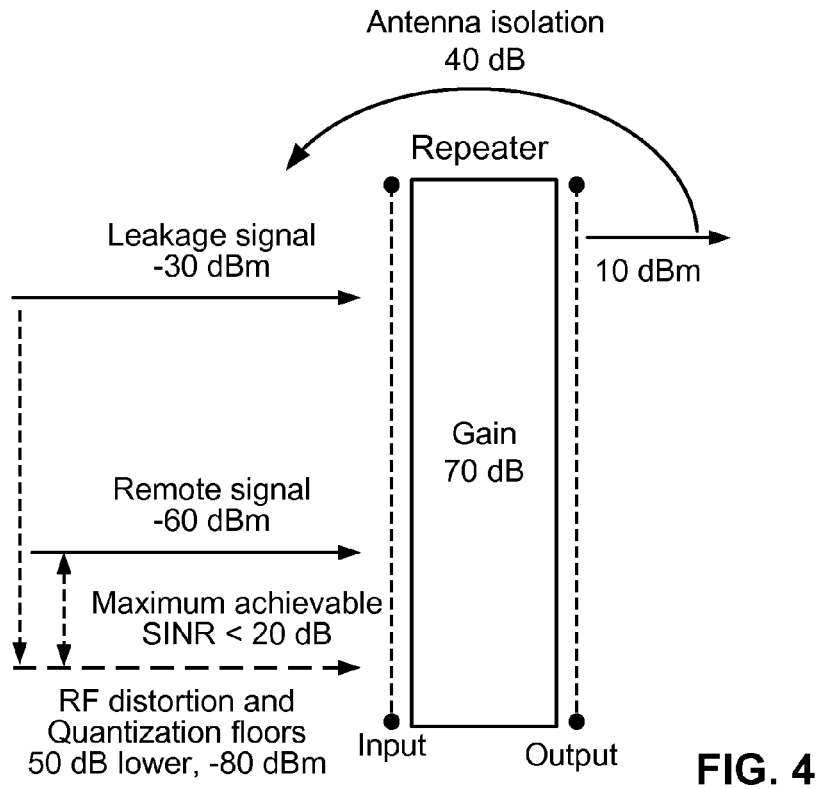
FIG. 4 illustrates the effect of feedback signal on the noise floor at the repeater input for a repeater implementing the gain control method according to one embodiment of the present invention.

FIG. 4 illustrates the effect of feedback signal on the noise floor at the repeater input for a repeater implementing the gain control method according to one embodiment of the present invention. In the embodiment shown in FIG. 4, the gain of the repeater is reduced to 70 dB. While the coverage area of the repeater is reduced due to the reduced gain, the achievable SINR increased to 20 dB, thereby allowing a higher data rate to be used.

More specifically, reducing the overall gain of the repeater reduces the feedback signal power. This in turn reduces the noise floors caused by the RF distortions and quantization effects and thereby allows higher achievable SINR. A higher data rate can be used due to the higher SINR. The achievable SINR is only limited by the SINR of the remote signal. In the embodiment shown in FIG. 4, an increase of 10 dB of SINR is realized with a 10 dB reduction in gain as compared to the embodiment shown in FIG. 3. However, reducing the repeater gain also reduces the coverage area. Depending on the repeater usage, a reduction in the coverage area may be acceptable to the end user. The gain control method of the present invention allows the end user to trade-off repeater coverage area with achievable output SINR (which corresponds to the maximum data rate). The gain control method of the present invention is especially useful for wireless data traffic where the end user may be willing to sacrifice coverage area when using applications that demand higher data rates.

Figure 5A:
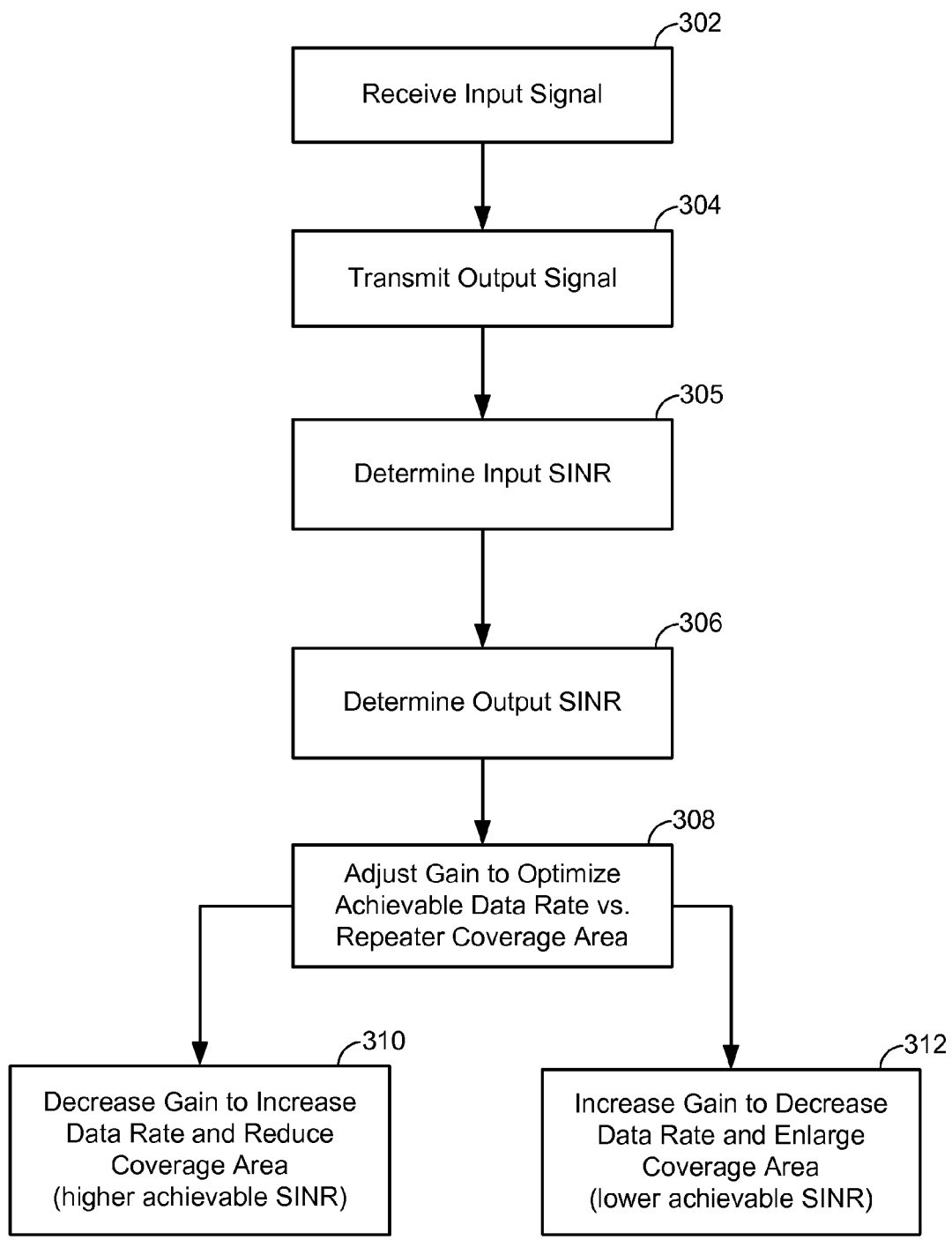
FIG. 5A is a flow chart illustrating the gain control method for a wireless repeater according to one embodiment of the present invention.
Figure 5B:
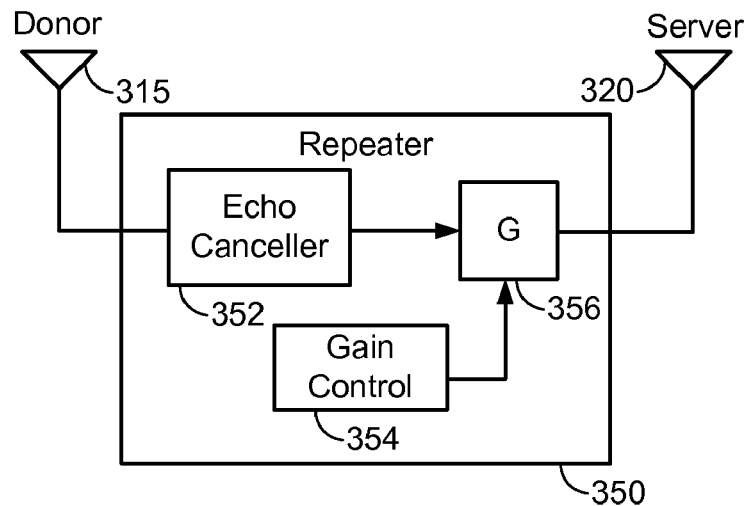
FIG. 5B is a block diagram of a repeater according to one embodiment of the present invention.

The gain control method of the present invention will now be described in detail with reference to FIGS. 5A and 5B. FIG. 5A is a flow chart illustrating the gain control method for a wireless repeater according to one embodiment of the present invention. FIG. 5B is a block diagram of a repeater according to one embodiment of the present invention. Referring to FIGS. 5A and 5B, a repeater 350 receives an input signal on a donor antenna 315 (step 302). Repeater 350 also transmit an output signal on a server antenna 320 (step 304). Repeater 350 includes an echo canceller 352 for implementing cancellation of the feedback signal. Repeater 350 amplifies the input signal at a gain stage 356 providing a variable gain G. Variable gain G is set by a gain control block 354. In operation, the gain control method of the present invention determines the input SINR (step 305) and the output SINR of the repeater (step 306). In one embodiment, the input SINR is used as an indicator of the output SINR and the noise floors added by the repeater. Then, the repeater gain is adjusted up or down to obtain the desired coverage area and the achievable data rate (step 308). The repeater gain is decreased to reduce the coverage area but increase the data rate (step 310). By decreasing the gain, the achievable SINR is increased. The repeater gain is increased to enlarge the coverage area but decrease the data rate (step 312). By increasing the gain, the achievable SINR is decreased. In this manner, the repeater gain and the coverage area of the repeater is traded off to optimize the SINR at the input or output of the repeater and optimize the data rate used by the repeater.

Figure 5C:
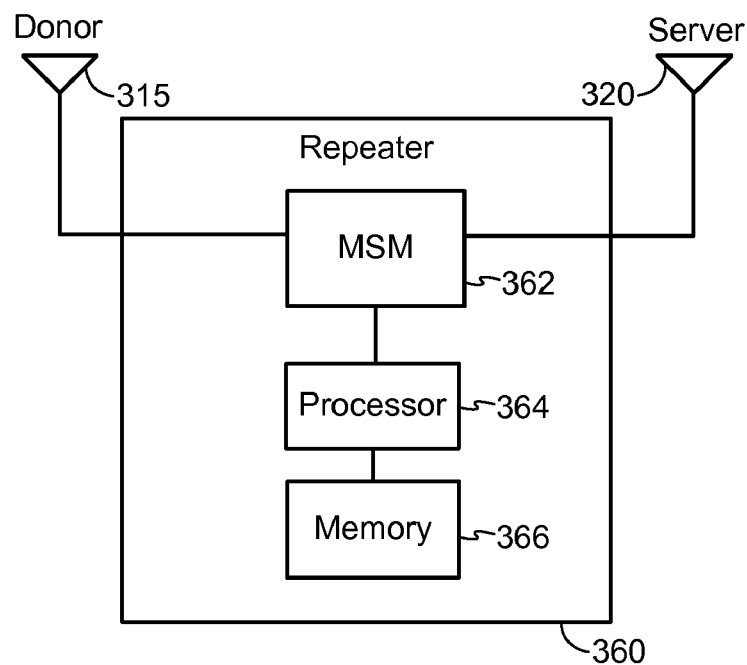
FIG. 5C is a block diagram of a repeater according to another embodiment of the present invention.

FIG. 5C is a block diagram of a repeater according to another embodiment of the present invention. FIG. 5C illustrates a functional block diagram of a repeater 360 including a mobile station modem (MSM) providing communication on donor and server antennas 315, 320, a processor 364 for performing variable repeater operations and a memory 366 for storing data. In the present embodiment, the MSM (mobile station modem) at the repeater is used to give an estimate of the input SINR. In other embodiments, other methods for estimating the input or output SINR of the repeater can be used.

2. Multi-Metric Gain Control

Figure 6:
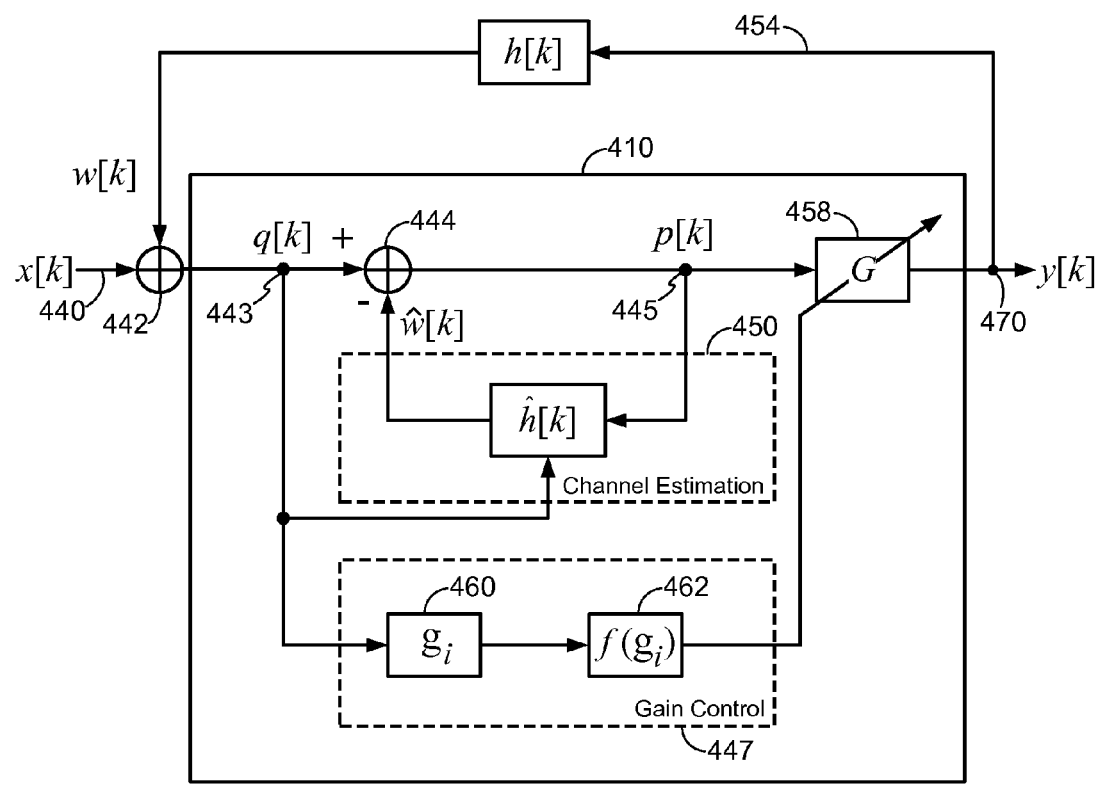
FIG. 6 is a block diagram of a repeater incorporating a gain control unit according to one embodiment of the present invention

According to embodiments of the present invention, a repeater includes a gain control block employing multiple metrics as indicators of system stabilities where the multiple metrics are monitored for use in controlling the gain of the repeater. The gain control block implements a gain control method where the repeater gain is controlled based on the multiple metrics. FIG. 6 is a block diagram of a repeater incorporating a gain control block according to one embodiment of the present invention. In the present embodiment, the gain control block is implemented in an echo cancelling repeater. In other embodiments, the gain control block can be implemented in a repeater without echo cancellation to provide gain control based on multiple metrics as described below.

Referring to FIG. 6, an echo-cancellation repeater 410 receives a remote signal x[k] to be repeated on a donor antenna (denoted as input node 440) and generates an output signal y[k] to be transmitted on a server antenna (denoted as output node 470). Signal leakage from the server antenna back to the donor antenna causes part of the output signal y[k] to be leaked back and added to the remote signal before being received by the repeater. The signal leakage is represented as a feedback channel h[k], denoted as a signal path 454 between output node 470 and the input node 440. Thus, repeater 410 actually receives as the input signal on a node 443 a receive signal q[k] being the sum of the remote signal x[k] and the feedback signal w[k]. The feedback channel h[k] thus form a feedback loop in repeater 410 between the donor antenna and the server antenna. A summer 442 in FIG. 6 is symbolic only to illustrate the signal components of receive signals q[k] and does not represent an actual signal summer in the operating environment of repeater 410.

Repeater 410, being an echo-cancellation repeater, operates to estimate the feedback signal w[k] in order to cancel out the undesired feedback signal component in the receive signal ("the input signal"). To that end, repeater 410 includes an echo canceller formed by a summer 444 and a channel estimation block 450. The receive signal q[k] is coupled to summer 444 which operates to subtract a feedback signal estimate ŵ[k] from the receive signal q[k]. As long as the feedback signal estimate ŵ[k] is accurate, the undesired feedback signal is removed from the receive signal and echo cancellation is realized. In the present embodiment, the post cancellation signal p[k] is coupled to a variable gain stage 458 providing a gain of G to the post cancellation signal. Gain stage 458 generates the output signal y[k] on the output node 470 for transmission on the server antenna. FIG. 6 illustrates only elements that are relevant to operation of the gain control method of the present invention. Repeater 410 may include other elements not shown in FIG. 6 but known in the art to realize the complete repeater operation.

Feedback signal estimate ŵ[k] is generated based on a feedback channel estimate ĥ[k] where the feedback channel estimate is generated by a channel estimation block 450. In the present embodiment, the channel estimation block 450 takes as an input signal the receive signal q[k] and uses the echo-cancelled signal p[k] as the pilot signal or the reference signal for channel estimation to generate the feedback channel estimate ĥ[k]. Then, echo canceller computes the feedback signal estimate w[k] based on the feedback channel estimate h[k]. More specifically, the feedback signal estimate ŵ[k] is obtained by convolving the feedback channel estimate ĥ[k] with the pilot signal p[k] (i.e., ŵ[k]=ĥ[k]⊗p[k]). The feedback signal estimate ŵ[k] is used for echo cancellation at summer 444. More specifically, the feedback signal estimate ŵ[k] is subtracted from the receive signal q[k] to generate the echo-cancelled signal p[k]. It is imperative to note that FIG. 6 illustrates one method for implementing echo cancellation in a repeater. FIG. 6 is illustrative and is not intended to be limiting. An echo cancelling wireless repeater of the present invention can implement other methods for echo cancellation. The exact method of echo cancellation used in the repeater is not critical to the practice of the present invention.

Repeater 410 incorporates a gain control block 447 for adjusting the variable gain value G provided by gain stage 458. Gain control block 447 receives a gain control input signal which can be taken from anywhere in the feedback loop of the repeater. More specifically, the gain control input signal can be taken before echo cancellation or after echo cancellation in an echo cancelling repeater. In the present embodiment, the gain control input signal is taken as the receive signal q[k] but this is illustrative only. In practice, the exact location of where the gain control input signal is taken is not critical to the practice of the present invention. In other embodiments, the repeater does not implement echo cancellation and the gain control block 447 receives a gain control input signal which can be a signal anywhere in the feedback loop of the repeater. Again, the exact location of where the gain control input signal is taken is not critical to the practice of the present invention. Accordingly, in the following description, the term "gain control input signal" refers to the input signal provided to the gain control block of the repeater and can be a signal taken at any point in the feedback loop of the repeater, including before echo cancellation, after echo cancellation, or any point in the feedback loop in a repeater not implementing echo cancellation.

Gain control block 447 includes a gain metric calculator 460 for receiving the gain control input signal and calculating and generating a set of gain control metrics. In one embodiment, two gain control metrics are used. Gain control block 447 further includes a gain control algorithm block 462 receiving the gain control metrics from the gain metric calculator 460. The gain control algorithm block 462 provides control of the variable gain G of the gain stage 458 in repeater 410.

The derivation of a first gain control metric is described with reference to FIG. 6. First, a complex signal segment of length N at time i from the repeater feedback control loop is intercepted or received and used as the gain control input signal:

$$r_i[n] = \frac{q[n+i]}{\sqrt{\sum_{i=0}^{N-1}|q[n+i]|^2}}, 0 \le n < N.$$

In the present embodiment, the complex signal $r_i[n]$ is taken at node 443 which is before echo cancellation. In other embodiments, the complex signal $r_i[n]$ can be taken at other locations in the feedback control loop, such as after echo cancellation. In the present description, the repeater feedback control loop (also referred to as the "control loop") refers to the feedback loop inherently formed in the repeater between the transmitting antenna and the receiving antenna as a result of the feedback channel from the transmitting antenna to the receiving antenna. The gain of the feedback loop ("the loop gain") is measured and controlled to maintain loop stability.

The gain metric calculator 460 monitors the growth of this signal component in the loop by trying to pick up replicas of the signal, as a result of the leakage from the transmit antenna to the receive antenna. Searching in a search window W after time $N_{delay}$ at $\tau \in W = \{0, 1, L, N_{tap}-1\}$ gives $$g_i(\tau) = \frac{\left|\sum_{n=0}^{N-1} r^*[n]q[n+i+N_{delay}+\tau]\right|^2}{\sum_{n=0}^{N-1}|q[n+i]|^2}$$

$$= \left( \frac{\left| \sum_{n=0}^{N-1} q^*[n+i]q[n+i+N_{delay}+\tau] \right|}{\sum_{n=0}^{N-1} |q[n+i]|^2} \right)^2.$$

The loop gain metric $g_i(\tau)$ given above is essentially the loop gain which is an indicator of system stability. The loop gain metric $g_i(\tau)$ given above computes the loop gain for each channel tap $\tau$ and is referred hereinafter as the "tap-specific gain control metric." The tap-specific gain control metric $g_i(\tau)$, when summed over all channel taps, can be used for adjusting the gain $G_i$ of the variable gain stage 458 in a way such that:

$$g_i = \sum_{\tau \in \{0,1,L,N_{tap}-1\}} \alpha(\tau) g_i(\tau) \approx \delta < 1.$$

That is, the tap-specific gain control metric $g_i(\tau)$ is measured and summed over all of the desired channel taps and the summed value is the gain control metric $g_i$ for the repeater which is maintained to be about the value $\delta$ which is less than 1. Typically, $\delta$ is determined by the output SINR requirement. In one embodiment, $\delta$ is selected to be −10 dB to −20 dB in accordance with the required output SINR. Also, for typical repeater operation, the total loop gain has to be less than 1 (0 dB) for stability. In one embodiment, $\delta$ is selected to be −20 dB when the required output SINR is in the range of 20 dB. In the above equation, the gain control metric $g_i$ is computed as a linear combination of the tap-specific gain control metric $g_i(\tau)$ over all channel taps, each tap-specific gain control metric $g_i(\tau)$ being multiplied by its own coefficient $\alpha(\tau)$, which can be 1 for a straight summation of the tap-specific gain control metric terms or other values for other forms of linear combination. In other embodiments, the gain control metric $g_i$ can be computed as a non-linear combination of the tap-specific gain control metric $g_i(\tau)$ over all of the desired channel taps.

In one embodiment, the gain control metric g, shown above is simulated in the absence of echo cancellation and gain control and with white input signal. A sampling rate of 30 MHz is used and a delay of the search window of $N_{delay}$=30×5 is used. The length of the search window is $N_{tap}$=64. The integration length is N=30×10 samples. The gain control metric is able to accurately estimate the actual loop gain for loop gains higher than −20 dB. However, the estimation noise baseline prevents the gain control metric from estimating loop gain levels lower than −20 dB. In the case where the target loop gain level is −20 dB, a metric with lower noise baseline is desired. A lower noise baseline can be obtained by increasing the integration length N. In one embodiment, the integration length N is increased to 30×200 samples. When the gain control metric uses an integration length of N=30×200 samples, the increased integration length allows the gain control metric to estimate loop gain accurately above −30 dB.

Figure 7:
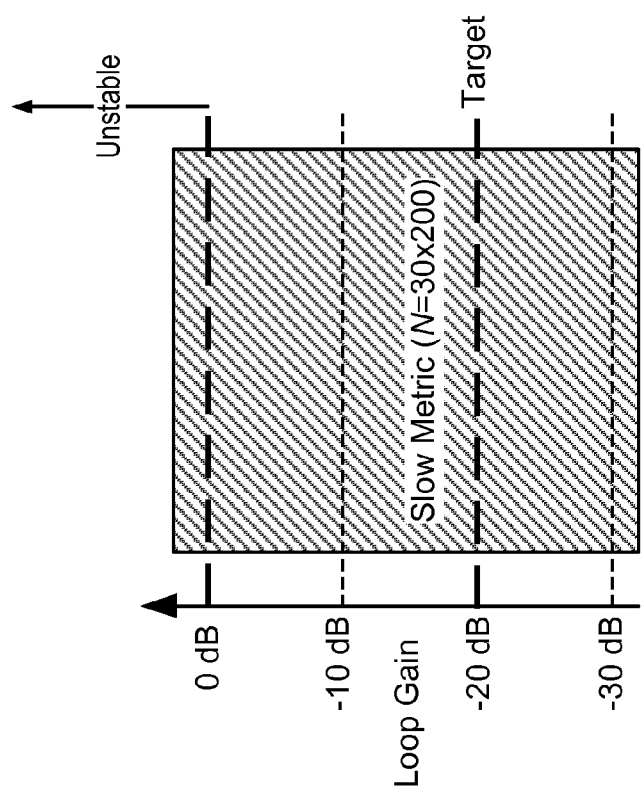
FIG. 7 illustrates the use of a single slow gain control metric to cover the entire loop gain region of interest.

In one embodiment of the gain control method of the present invention, a single gain control metric having a long integration length is used. The long integration length increases the response time and therefore a gain control metric with a long integration length is referred herein as a "slow metric". For instance, in one embodiment, a gain control metric with integration length of N=30×200 samples (the "slow metric") is used for gain control with loop gain target of −20 dB. FIG. 7 illustrates the use of a single slow gain control metric to monitor the entire loop gain region of interest. However, the slow metric uses a long integration length and therefore has a long response time. In one example, an integration length of N=30×200 samples requires a response time of 200 μsec. Thus, while the slow metric is advantageous for slow adjustment, the slow metric may be too slow to respond to abrupt disturbances that may throw the repeater out of the stable region.

According to other embodiments of the gain control method of the present invention, the gain control method uses multiple gain control metrics to monitor loop stability for controlling the repeater gain. In one embodiment, the gain control method uses a "fast metric" in conjunction with a "slow metric" to monitor the entire loop gain region of interest. As described above, a "slow metric" refers to a gain control metric having a long integration length and therefore a slow response time. However, the slow metric uses a large number of samples and hence is slow but very accurate. On the other hand, a "fast metric" refers to a gain control metric having a short integration length and therefore a fast response time. However, the fast metric uses a small number of samples and hence the fast metric is fast but less accurate. In one embodiment, the fast metric with a fast response time is used to monitor the critical region of loop gain near 0 dB where the feedback control loop of the repeater approaches instability. In this critical region, a fast response is desired to allow the repeater gain to be adjusted quickly to ensure loop stability. On the other hand, the slow metric with a slow response time is used to monitor the normal stable region of loop gain where more accurate loop gain measurements are desired. In the present description, the integration length is defined as the sum of the coherent integration time and the non-coherent integration time.

Figure 8:
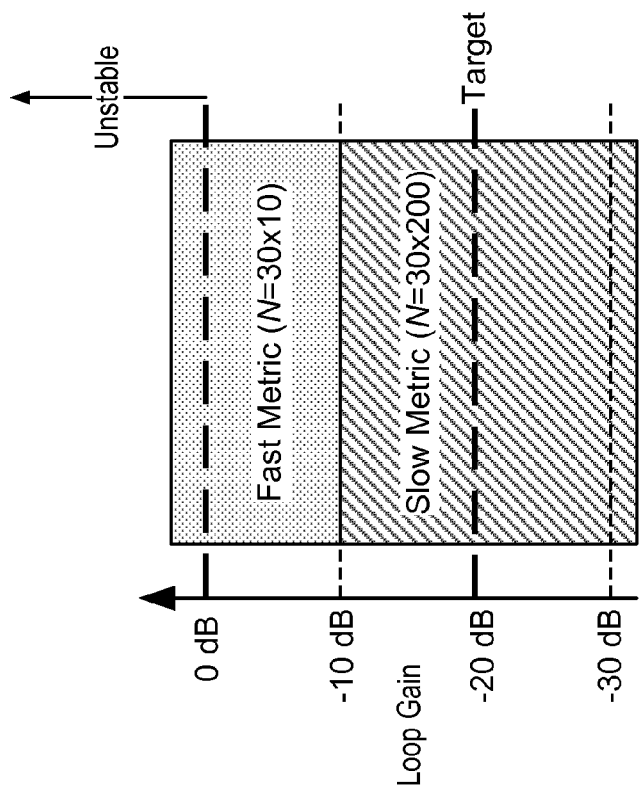
FIG. 8 illustrates the use of a slow and a fast gain control metric to monitor the entire loop gain region of interest according to one embodiment of the present invention.

FIG. 8 illustrates the use of a slow and a fast gain control metric to monitor the entire loop gain region of interest according to one embodiment of the present invention. Referring to FIG. 8, a fast metric with integration length N=30×10 samples and a response time of 10 μsec is used to monitor the loop gain in the critical region of loop gain at or higher than −10 dB. The region of loop gain at or higher than −10 dB represents loop gain that approaches 0 dB (or loop gain equal to or greater than 1) where loop instability can result. The fast metric ensures fast gain control response for the repeater. In conjunction with the fast metric, a slow metric with integration length N=30×200 samples and a response time of 200 μsec is used to monitor the loop gain in the normal stable region of loop gain greater than −10 dB and around the target loop gain of −20 dB. When the loop gain is sufficiently away from the instability region, accurate loop gain measurements are desired to allow fine adjustment of the repeater gain to the desired gain value. The slow metric provides more accurate loop gain measurements to allow the repeater gain to be accurately controlled. By using two metrics to monitor and measure the entire loop gain region of interest, accurate gain control from −30 dB to −10 dB is realized and fast gain control above −10 dB is realized.

Figure 9:
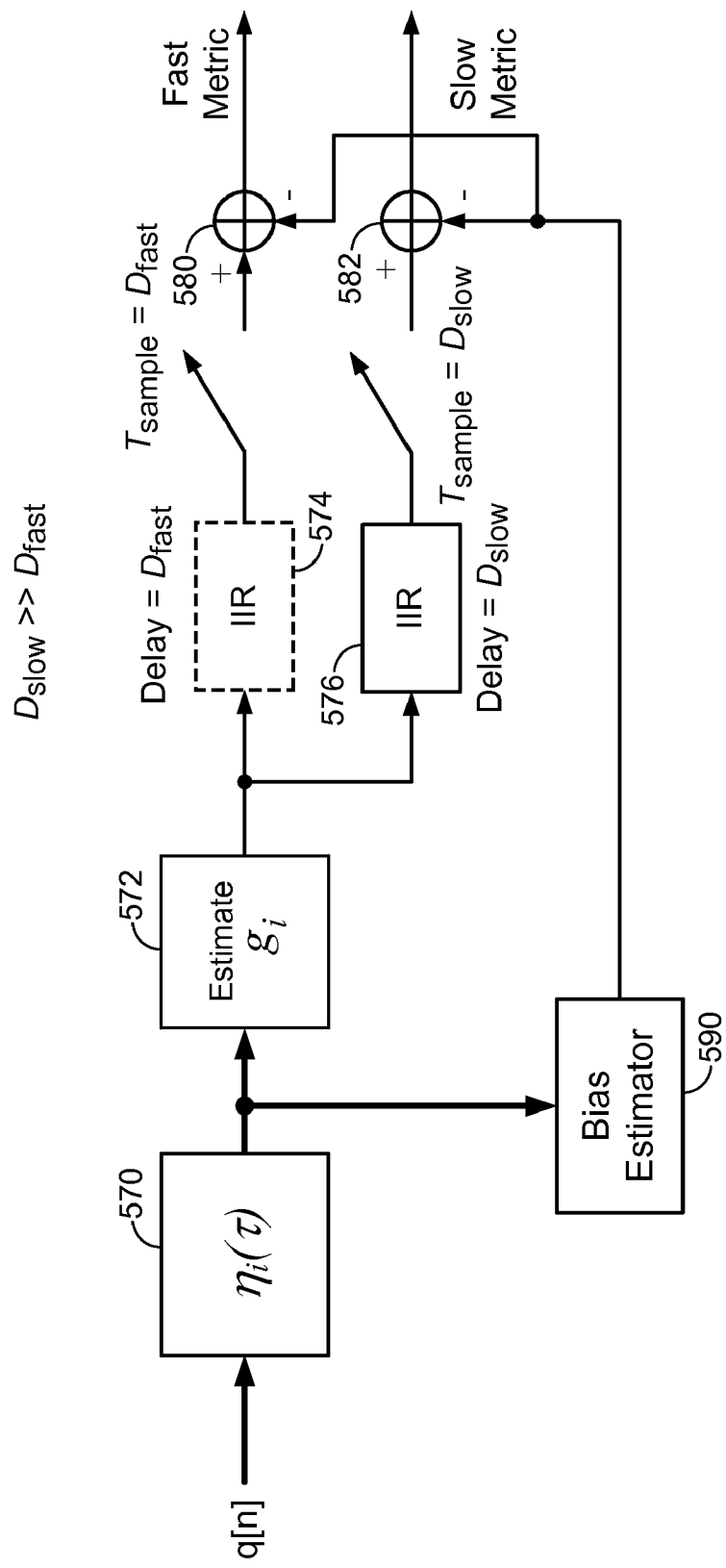
FIG. 9 is a block diagram of a gain metric calculator in a gain control unit of a repeater according to one embodiment of the present invention.

FIG. 9 is a block diagram of a gain metric calculator in a gain control block of a repeater according to one embodiment of the present invention. Referring to FIG. 9, a gain metric calculator 560 takes as input a gain control input signal and generates as outputs a fast metric and a slow metric. The fast metric and the slow metric are used by the gain control algorithm block in the gain control block to generate the control signal for controlling the variable gain of the repeater, as shown in FIG. 6. The gain metric calculator 560 is constructed as follows. The receive signal q[n] is used as the gain control input signal for gain metric calculation. At block 570, the receive signal q[n] is used to compute a normalized correlation (complex) value $\eta_i(\tau)$ at a channel tap $\tau$ which detects the feedback signal at channel tap $\tau$. The normalized correlation (complex) value $\eta_i(\tau)$ is given as:

$$\eta_i(\tau) = \frac{\left|\sum_{n=0}^{N-1} q*[n]q[n + N_{delay} + \tau]\right|}{\sum_{n=0}^{N-1} |q[n]|^2}.$$

Then at block 572, the normalized correlation value $\eta_i(\tau)$ is squared and summed over all channel taps to generate an estimated gain control metric value $g_i$. More specifically, squaring of the complex normalized correlation value $\eta_i(\tau)$ gives the feedback energy relative to the output signal energy at channel tap $\tau$ while summation of squared $\eta_i(\tau)$ at all corresponding channel taps gives the total relative feedback energy which is an estimate of the loop gain of the feedback loop. The estimated gain control metric $g_i$ given as:

$$g_i = \sum_\tau |\eta_i(\tau)|^2.$$

After computing the gain control metric $g_i$, two infinite impulse response (IIR) filters 574, 576 are used in parallel to generate the fast metric and the slow metric in parallel. In other embodiments, other types of filters, such as FIR, can also be used. IIR filter 574 is used to generate the fast metric and uses a delay value of $D_{fast}$, while IIR filter 576 is used to generate the slow metric and uses a delay value of $D_{slow}$, where $D_{slow}$ is much greater than $D_{fast}$. The delay values are determined by the filter bandwidth. The output of IIR filter 574 is sampled by a switch 575 having a sampling time $T_{sample}$ equals to $D_{fast}$. The output of IIR filter 576 is sampled by a switch 577 having a sampling time $T_{sample}$ equals to $D_{slow}$. The non-coherent integration time is determined by the delay values $D_{fast}$ or $D_{slow}$.

In FIG. 9, the receive signal q[n] before echo cancellation is used as the gain control input signal for gain metric calculation. In other embodiments, other signal from the feedback loop, such as after echo cancellation, can be used as the gain control input signal for gain metric calculation.

In the present embodiment, gain metric calculator 560 includes a bias estimator 590 for removing any undesired bias in the metric calculation. The detail operation of bias estimator 590 will be described in more detail below. In general, bias estimator 590 takes as input the normalized correlation value (complex) $\eta_i(\tau)$ and generates a bias value which is to be subtracted from the fast and slow metric outputs from the IIR filters. More specifically, the sampled output of IIR filter 574 is coupled to a summer 580 and the sampled output of IIR filter 576 is coupled to a summer 582. At summers 580 and 582, the estimated bias value is subtracted from sampled outputs to generate the fast metric and slow metric respectively.

As thus constructed, gain metric calculator 560 provides two gain control metrics for use by the gain control algorithm. The gain control algorithm selects the desired metrics based on the loop gain value. If the loop gain is around or close to the instability region (such as around –5 dB), then the fast metric is used to obtain fast gain control response. If the loop gain is in the normal stable region (such as around –20 dB), then the slow metric is used to obtain more accurate gain control.

Figure 10:
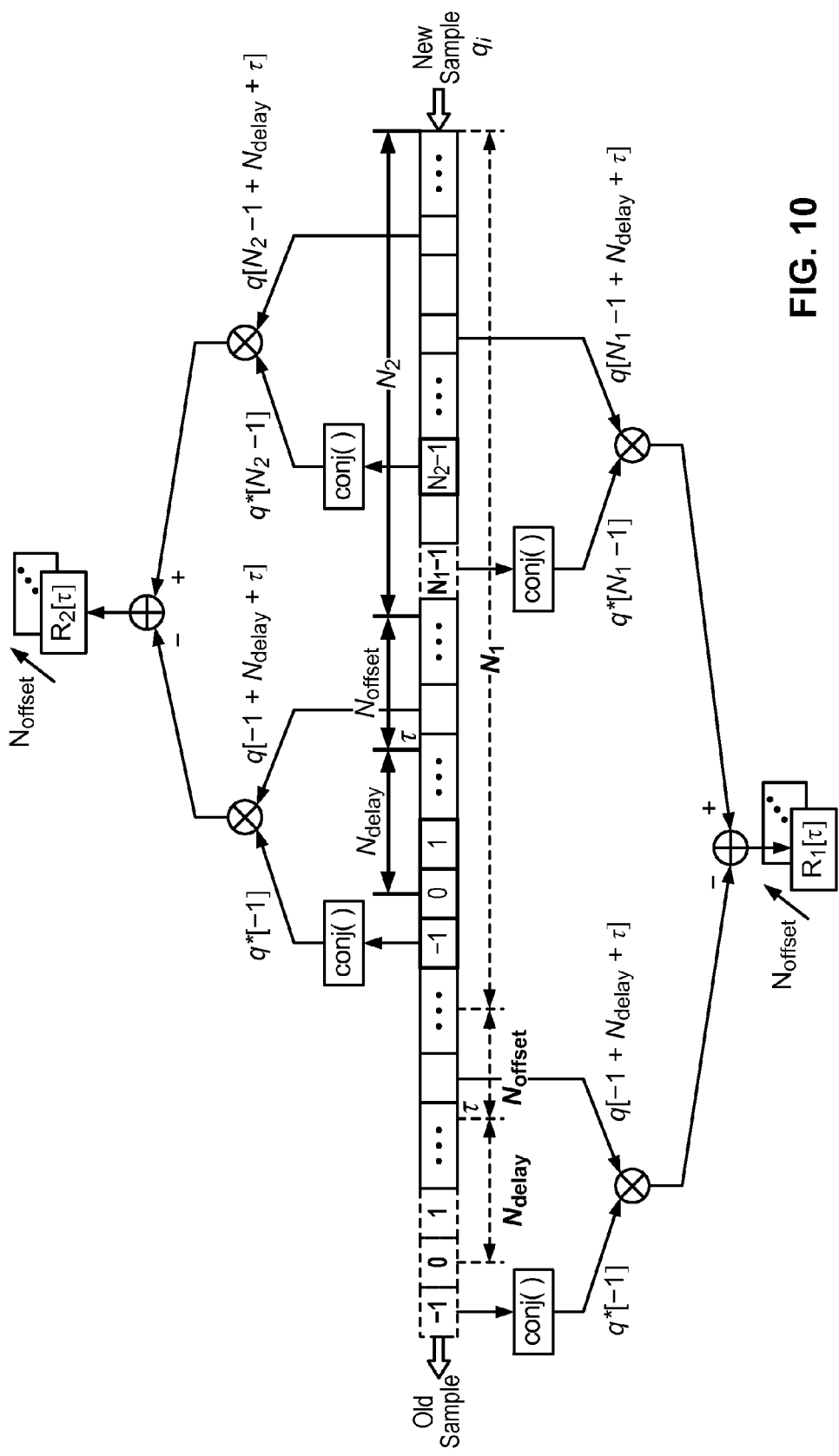
FIG. 10 illustrates the computation of the correlation value $R_i$ of the fast and slow metric using shorter and longer coherent integrate time according to one embodiment of the present invention.
Figure 11:
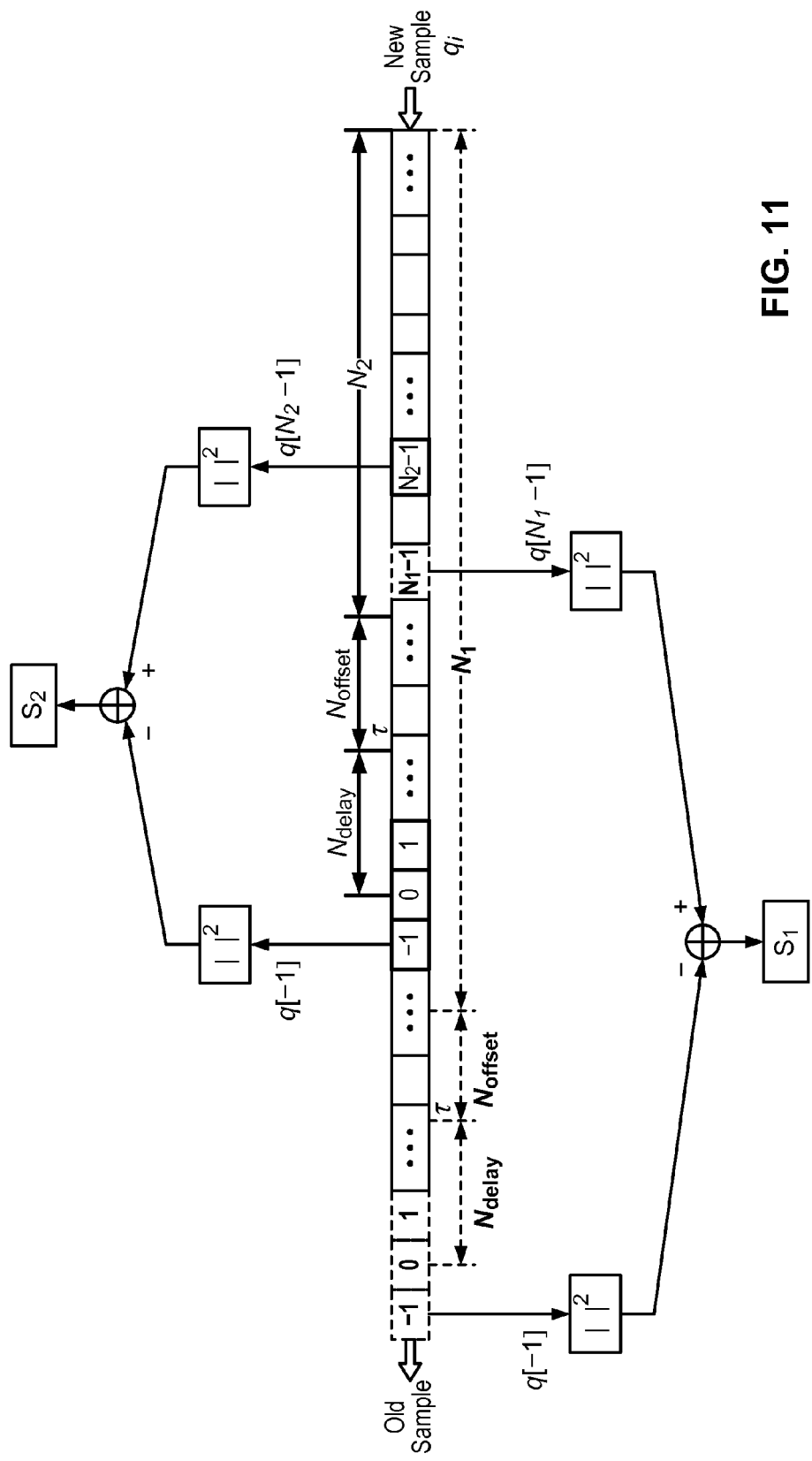
FIG. 11 illustrates the computation of the normalization value $S_i$ of the fast and slow metric using shorter and longer coherent integrate time according to one embodiment of the present invention.
Figure 12:
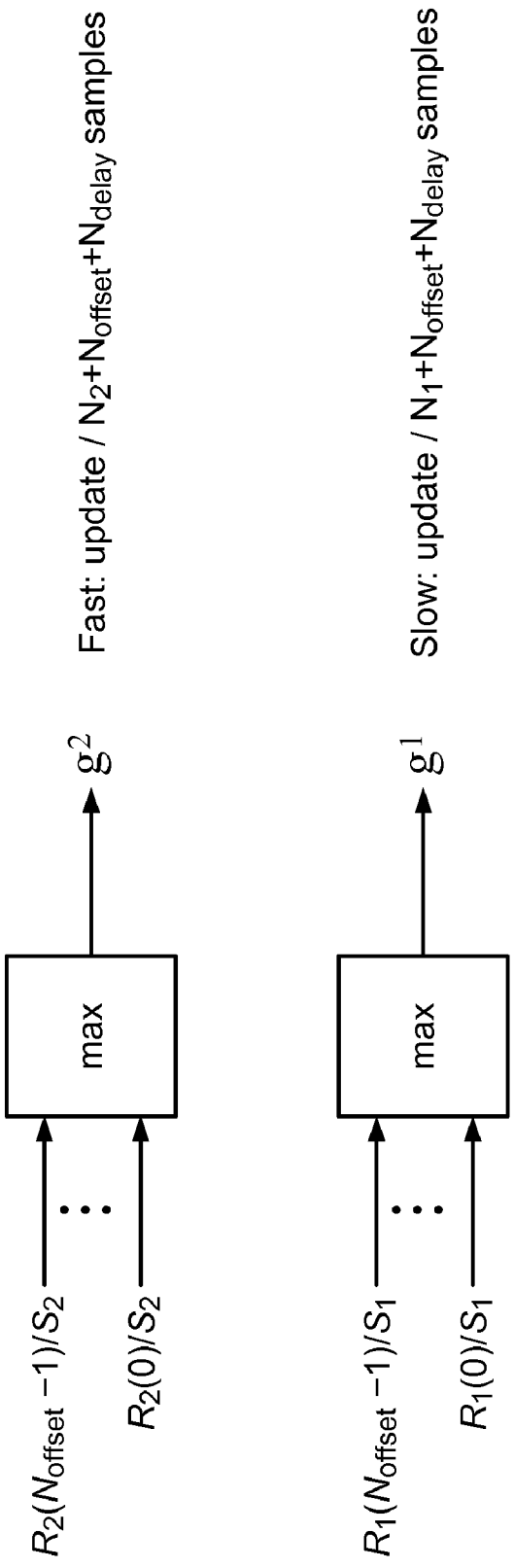
FIG. 12 illustrates the computation of the fast and slow metric using the correlation and normalization values in FIG. 10 and FIG. 11 according to one embodiment of the present invention.

In the above description, the slow and fast metrics are realized using a large number and a small number of samples, respectively. According to another embodiment of the gain control method of the present invention, the fast and slow metrics are realized using different coherent integration times without using noncoherent filtering. For the fast metric, a shorter coherent integration time is used. For the slow metric, a longer coherent integration time is used. FIG. 10 illustrates the computation of a correlation value $R_i$ of the fast and slow metrics using shorter and longer coherent integration times according to one embodiment of the present invention. More specifically, correlation value $R_1[\tau]$ corresponds to the slow metric where a longer coherent integration time is used while correlation value $R_2[\tau]$ corresponds to the fast metric where a shorter coherent integration time is used. FIG. 11 illustrates the computation of the normalization value $S_i$ of the fast and slow metrics using shorter and longer coherent integrate times according to one embodiment of the present invention. More specifically, normalization value $S_1$ corresponds to the slow metric where a longer coherent integration time is used while normalization value $S_2$ corresponds to the fast metric where a shorter coherent integration time is used. FIG. 12 illustrates the computation of the fast metric $g^2$ and the slow metric $g^1$ using the correlation values $R_i$ and the normalization values S in FIG. 10 and FIG. 11 according to one embodiment of the present invention.

3. Repeater Stability Indicator

A repeater should be maintained unconditionally stable. A metric that indicates the stability of a repeater is therefore desirable. According to embodiments of the present invention, a repeater stability monitoring method and apparatus operate by intercepting certain period of a signal from the repeater feedback loop and monitor the "growth" of that signal component in the loop for a period of time. If the signal component in the feedback loop dies down, the repeater system is stable. As described above, the repeater feedback loop (or "control loop") refers to the feedback loop inherently formed in the repeater between the transmitting antenna and the receiving antenna. The gain of the feedback loop ("the loop gain") is measured and controlled to maintain loop stability.

Figure 13:
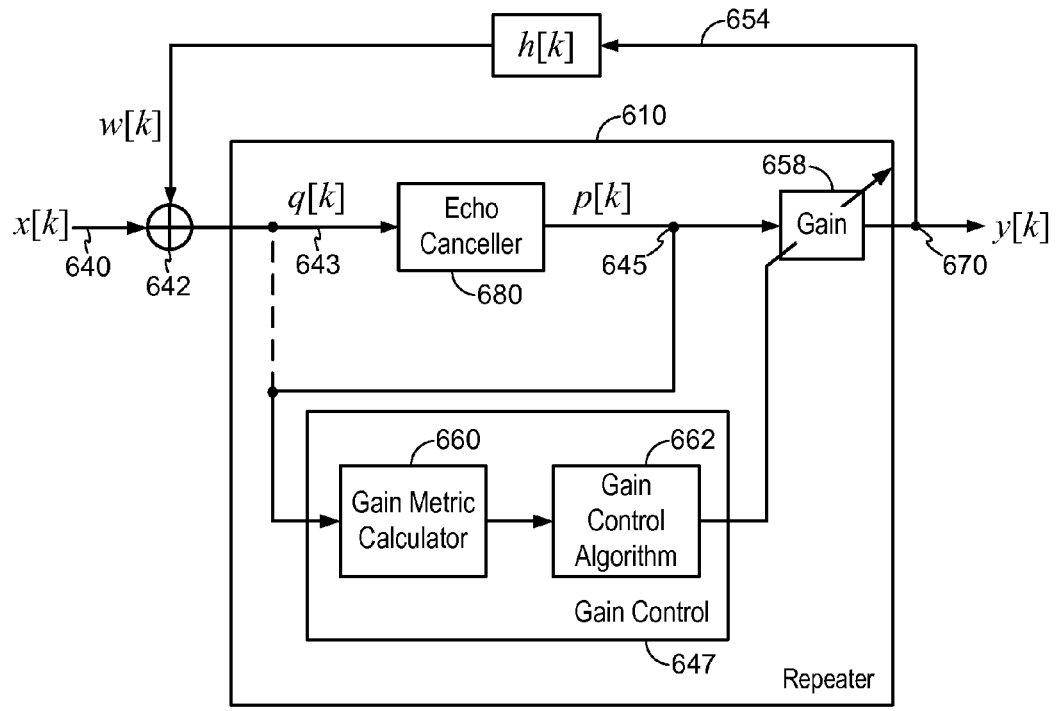
FIG. 13 is a block diagram of a repeater employing echo cancellation illustrating the gain control method according to an alternate embodiment of the present invention.
Figure 14:
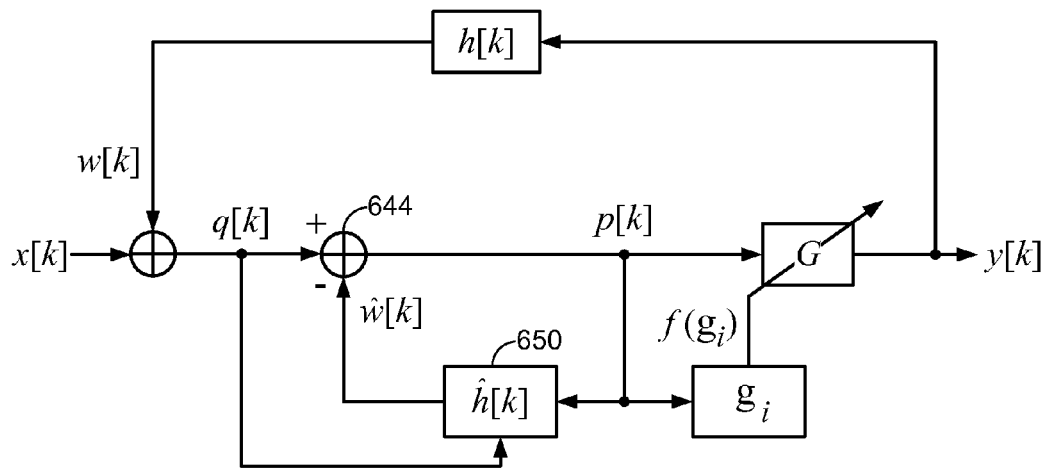
FIG. 14 illustrates the mathematical mode of a repeater incorporating the gain control method according to an alternate embodiment of the present invention.

FIG. 13 is a block diagram of a repeater employing echo cancellation illustrating the repeater stability monitoring and gain control method according to one embodiment of the present invention. FIG. 14 illustrates the mathematical mode of the repeater incorporating the repeater stability monitoring and gain control method according to one embodiment of the present invention. Referring to FIG. 13, an echo-cancellation repeater 610 receives a remote signal x[k] to be repeated on a donor antenna (denoted as input node 640) and generates an output signal y[k] to be transmitted on a server antenna (denoted as output node 670). Signal leakage from the server antenna back to the donor antenna causes part of the output signal y[k] to be leaked back and added to the remote signal before being received by the repeater. The signal leakage is represented as a feedback channel h[k], denoted as a signal path 654 between output node 670 and the input node 640. Thus, repeater 610 actually receives as the input signal on a node 643 a receive signal q[k] being the sum of the remote signal x[k] and the feedback signal w[k]. The feedback channel h[k] thus form a feedback loop in repeater 610 between the donor antenna and the server antenna. A summer 642 in FIG. 13 is symbolic only to illustrate the signal components of receive signals q[k] and does not represent an actual signal summer in the operating environment of repeater 610.

Repeater 610, being an echo-cancellation repeater, operates to estimate the feedback signal w[k] in order to cancel out the undesired feedback signal component in the receive signal ("the input signal"). To that end, repeater 610 includes an echo canceller 680 which includes a summer 644 and a channel estimation block 650 (FIG. 14). The receive signal q[k] is coupled to summer 644 which operates to subtract a feedback signal estimate ŵ[k] from the receive signal q[k]. As long as the feedback signal estimate ŵ[k] is accurate, the undesired feedback signal is removed from the receive signal and echo cancellation is realized. In the present embodiment, the post cancellation signal p[k] (node 645) is coupled to a variable gain stage 658 providing a gain of G to the post cancellation signal. Gain stage 658 generates the output signal y[k] on the output node 670 for transmission on the server antenna. FIG. 13 illustrates only elements that are relevant to operation of the gain control method of the present invention. Repeater 610 may include other elements not shown in FIG. 13 but known in the art to realize the complete repeater operation.

Feedback signal estimate ŵ[k] is generated based on a feedback channel estimate ĥ[k] where the feedback channel estimate is generated by a channel estimation block 650. In the present embodiment, the channel estimation block 650 takes as an input signal the receive signal q[k] and uses the echo-cancelled signal p[k] as the pilot signal or the reference signal for channel estimation to generate the feedback channel estimate h[k]. Then, echo canceller computes the feedback signal estimate ŵ[k] based on the feedback channel estimate ĥ[k]. More specifically, the feedback signal estimate ŵ[k] is obtained by convolving the feedback channel estimate h[k] with the pilot signal p[k] (i.e., ŵ[k]=ĥ[k]⊗p[k]). The feedback signal estimate ŵ[k] is used for echo cancellation at summer 644. More specifically, the feedback signal estimate is subtracted from the receive signal q[k] to generate the echo-cancelled signal p[k]. FIG. 13 illustrates one method for implementing echo cancellation. FIG. 13 is intended to be illustrative only and is not intended to be limiting. In other embodiments, other methods for implementing echo cancellation can be used.

Repeater 610 incorporates a gain control block 647 for adjusting the variable gain value G provided by gain stage 658. Gain control block 647 includes a gain metric calculator 660 for calculating and monitoring a gain control metric. Gain control block 647 further includes a gain control algorithm block 662 receiving the gain control metrics from the gain metric calculator 660. The gain control algorithm block 662 provides control of the variable gain G of the gain stage 658 in repeater 610. Gain control block 647 receives a gain control input signal which can be taken from anywhere in the feedback loop of the repeater. More specifically, the gain control input signal can be taken before echo cancellation or after echo cancellation in an echo cancelling repeater. In the present embodiment, the gain control input signal is taken as the post-cancellation signal p[k] but this is illustrative only. In practice, the exact location of where the gain control input signal is taken is not critical to the practice of the present invention. In other embodiments, the repeater does not implement echo cancellation and the gain control block 647 receives a gain control input signal which can be a signal anywhere in the feedback loop of the repeater. Again, the exact location of where the gain control input signal is taken is not critical to the practice of the present invention.

The derivation of the gain control metric is now described with reference to FIG. 13 and FIG. 14. First, in the present embodiment, a complex signal segment of length N at i from the repeater feedback control loop (at node 645) is intercepted or received and used as the gain control input signal:

$$r_i[n] = \frac{q[n+i]}{\sqrt{\sum_{i=0}^{N-1} |q[n+i]|^2}}, \quad 0 \le n < N.$$

In other embodiments, the complex signal segment can be taken at other locations, such as at node 643 before the echo canceller 680.

The gain metric calculator 660 monitors the growth of this signal component in the loop by trying to pick up replicas of the signal, as a result of the leakage from the transmit antenna to the receive antenna. Searching in a search window W after time $N_{delay}$ at $\tau \in W \equiv \{0, 1, L, N_{tap}-1\}$ gives:

$$g_i(\tau) = \frac{\left|\sum_{n=0}^{N-1} r^*[n]p[n+i+N_{delay}+\tau]\right|^2}{\sum_{n=0}^{N-1} |p[n+i]|^2}$$

$$= \left(\frac{\left|\sum_{n=0}^{N-1} p^*[n+i]p[n+i+N_{delay}+\tau]\right|}{\sum_{n=0}^{N-1} |p[n+i]|^2}\right)^2.$$

The above metric is essentially the loop gain which is an indicator of system stability. The loop gain metric $g_i(\tau)$ given above computes the loop gain for each channel tap $\tau$ and is referred hereinafter as the "tap-specific gain control metric." The tap-specific gain control metric $g_i(\tau)$, when summed over all channel taps, can be used for adjusting the gain $G_i$ of the variable gain stage 658 in a way such that:

$$g_i = \sum_{\tau \in \{0,1,L,N_{tap}-1\}} \alpha(\tau)g_i(\tau) \approx \delta < 1.$$

That is, the tap-specific gain control metric $g_i(\tau)$ is measured and summed over a certain time period and the summed value is the gain control metric $g_i$ which is maintained to be about the value $\delta$ which is less than 1. Typically, $\delta$ is determined by the output SINR requirement. In one embodiment, $\delta$ is selected to be −10 dB to −20 dB in accordance with the required output SINR. In one embodiment, the gain control metric $g_i$ is computed as a linear combination of the tap-specific gain control metric $g_i(\tau)$ over all channel taps, each tap-specific gain control metric $g_i(\tau)$ being multiplied by its own coefficient $\alpha(\tau)$, which can be 1 for a straight summation of the tap-specific gain control metric terms or other values for other forms of linear combination. In other embodiments, the gain control metric $g_i$ can be computed as a non-linear combination of the tap-specific gain control metric $g_i(\tau)$ over all of the desired channel taps.

In one embodiment, the gain control metric $g_i$ shown above is simulated with a white input signal. A sampling rate of 20 MHz is used and a delay of the search window of $N_{delay}=100$ is used. The length of the search window is $N_{tap}=64$. The integration length is N=6400 samples. The gain control metric $g_i$ accurately indicates the loop gain levels. The noise baseline is less than −30 dB for 6400 samples of the correlation period.

In operation, the loop gain of the repeater is estimated by measuring the residual feedback signal that was not cancelled out by the echo canceller 680. In the case of a non-echo-cancelling repeater, the amount of feedback signal that is left from the antenna isolation is measured as an estimation of loop gain. The more feedback signal that is cancelled out, the more stable the system is.

In other words, the gain control metric is a measure of the correlation between the transmitted signal and the received signal. A large correlation indicates a large amount of leakage and less stability. The gain control algorithm will respond to the gain control metric and lower the gain. A small correlation indicates a small feedback signal and increased stability. The gain control algorithm will respond to the gain control metric and increase the gain. In this manner, the stability of the repeater is ensured.

4. Gain Control Metric Computation

Figure 15:
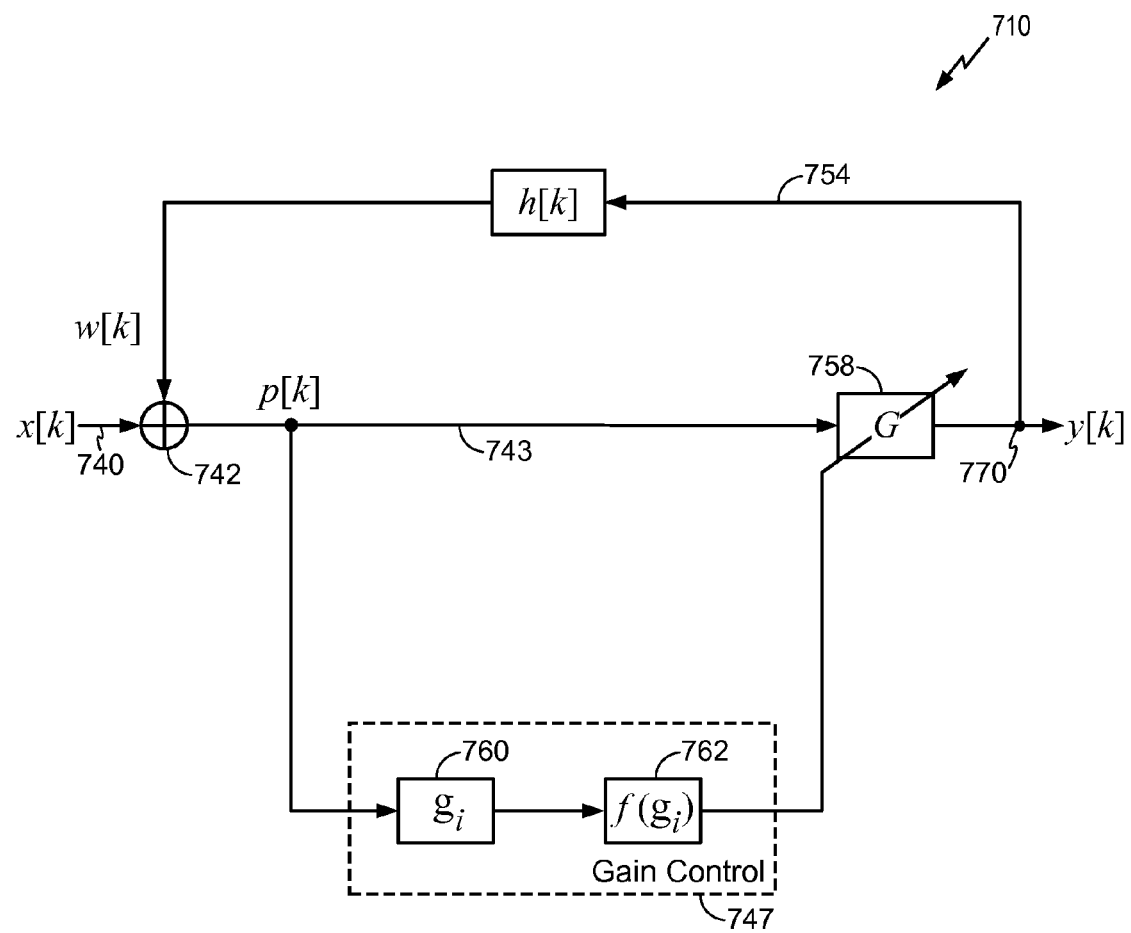
FIG. 15 is a block diagram of a repeater without echo cancellation and implementing the gain control method according to one embodiment of the present invention.

The gain control metric $g_i$ described above with reference to FIGS. 13 and 14 is capable of accurately monitoring the stability of a feedback system such as a repeater. The repeater stability monitoring method and apparatus can be adapted for use in a repeater with echo cancellation or without echo cancellation. FIG. 15 is a block diagram of a repeater without echo cancellation and implementing the gain control method according to one embodiment of the present invention. Referring to FIG. 15, a repeater 710 receives a remote signal x[k] to be repeated on a donor antenna (denoted as input node 740) and generates an output signal y[k] to be transmitted on a server antenna (denoted as output node 770). Signal leakage from the server antenna back to the donor antenna causes part of the output signal y[k] to be leaked back and added to the remote signal before being received by the repeater. The signal leakage is represented as a feedback channel h[k], denoted as a signal path 754 between output node 770 and the input node 740. Thus, repeater 710 actually receives as the input signal on a node 743 a receive signal p[k] being the sum of the remote signal x[k] and the feedback signal w[k]. The feedback channel h[k] thus form a feedback loop in repeater 710 between the donor antenna and the server antenna. A summer 742 in FIG. 15 is symbolic only to illustrate the signal components of receive signals p[k] and does not represent an actual signal summer in the operating environment of repeater 710. The receive signal p[k] is coupled to a variable gain stage 758 providing a gain of G. Gain stage 758 generates the output signal y[k] on the output node 770 for transmission on the server antenna. FIG. 15 illustrates only elements that are relevant to operation of the gain control method of the present invention. Repeater 710 may include other elements not shown in FIG. 15 but known in the art to realize the complete repeater operation.

Repeater 710 incorporates a gain control block 747 for adjusting the variable gain value G provided by gain stage 758. Gain control block 747 includes a gain metric calculator 760 for calculating and monitoring a gain control metric. Gain control block 747 further includes a gain control algorithm block 762 receiving the gain control metrics from the gain metric calculator 760. The gain control algorithm block 762 provides control of the variable gain G of the gain stage 758 in repeater 710 based on one or more functions, including at least the gain control metric generated by gain metric calculator 760. Gain control block 747 receives a gain control input signal which can be taken from anywhere in the feedback loop of the repeater. The exact location of where the gain control input signal is taken is not critical to the practice of the present invention.

As described above, in different embodiments of the present invention, a repeater implements gain control techniques for establishing the optimal gain value for the repeater while maintaining stability. To that end, the repeater includes a gain control block configured to measure and monitor one or more gain control metrics. The gain control block is also configured to control the gain of the repeater based at least in part on the gain control metric(s). In some embodiments, the repeater is an echo cancelling repeater (FIG. 13) and the gain control block 647 receives a gain control input signal which can be taken from anywhere in the feedback loop of the repeater. More specifically, the gain control input signal can be taken before echo cancellation or after echo cancellation. In other embodiments, the repeater does not implement echo cancellation (FIG. 15) and the gain control block 747 receives a gain control input signal which can be a signal anywhere in the feedback loop of the repeater. In the following description, the term "gain control input signal" refers to the input signal provided to the gain control block of the repeater and can be a signal taken at any point in the feedback loop of the repeater, including before echo cancellation, after echo cancellation, or without any echo cancellation.

The tap-specific gain control metric $g_i(\tau)$ at time i and at a channel tap $\tau$ described above is repeated here:

$$g_i(\tau) = \left( \frac{\left| \sum_{n=0}^{N-1} p^*[n+i] p[n+i+N_{delay}+\tau] \right|^2}{\sum_{n=0}^{N-1} |p[n+i]|^2} \right) = |\eta_i(\tau)|^2$$

The tap-specific gain control metric $g_i(\tau)$ can be characterized as a square of a correlation term $R_i$ in the numerator divided by a normalization term $S_i$ in the denominator, given as:

$$g_i[\tau] = (R[\tau]/S)^2 \quad \tau = 0, 1, L, N_{tap}-1,$$

where $\tau$ is the channel taps in time domain associated with the spread of the feedback signal in time domain, such as due to multipath effect. The correlation term and the normalization term are each computed for an integration length of N, that is, for N samples. Furthermore, the correlation term represents a correlation of the gain control input signal and a delayed version of the gain control input signal while the normalization term represents the power of the gain control input signal that is not delayed.

The gain control metric $g_i$ is the sum of the tap-specific gain control metric $g_i(\tau)$ over all the channel taps, given as:

$$g_i = \sum_{\tau \in ChannelTaps} g_i(\tau) = \sum_{\tau \in ChannelTaps} |\eta_i(\tau)|^2.$$

However, the calculation of the gain control metric is computationally intensive. For instance, for computing the correlation term $R_i$, a large number of multiplications is required to find the correlation value. More specifically, for an integration length of N, each time the correlation term needs to be updated, N complex multiplications have to be carried out; and each time the normalization term needs to be updated, another N complex multiplications have to be carried out. For large integration length N, the computational complexity can be prohibitive in practice.

According to embodiments of the present invention, a gain control metric computation method enables efficient implementation of the above-described gain control metric. A particular advantage of the gain control metric computation method of the present invention is that the complexity of the computation is independent of the integration length N, i.e., the complexity of the computation does not increase with the integration length.

First, in the computation of the correlation term $R_i$, at each time i, most of the multiplications are the same as the ones already computed in the previous time sample except for one. In the present embodiment, a register is used to hold the correlation value $R[\tau]$ at each lag $\tau$ computed for a previous N samples. All the multiplication terms from the previous time samples are computed and summed and stored in the register. When a new time sample is introduced, the (N+1)th previous sample becomes the old or obsolete sample. The correlation value $R[\tau]$ is computed by discarding the multiplication term of the obsolete sample and adding the multiplication term of the new sample to the stored correlation value. As a result, only two multiplications are performed at each time sample—one for the new sample and one for the obsolete sample. The product based on the new sample is added to the stored sum and the product based on the obsolete sample is subtracted from the stored sum to generate the updated correlation value $R[\tau]$.

More specifically, the correlation value at each lag $\tau$ is given as:

$$R_i(\tau) = \sum_{n=0}^{N-1} p^*[n+i]p[n+i+N_{delay}+\tau], \quad \tau = 0, 1, L, N_{tap} - 1.$$

The correlation value is updated once a new sample is received, as follows:

$$R_{i+1}[\tau] = \sum_{n=0}^{N-1} p^*[n+i+1]p[n+i+1+N_{delay}+\tau]$$

$$= \sum_{n=0}^{N-1} p^*[n+i]p[n+i+N_{delay}+\tau] +$$

$$p^*[N+i]p[N+i+N_{delay}+\tau] - p^*[i]p[i+N_{delay}+\tau]$$

$$= R_i[\tau] + p^*[N+i]p[N+i+N_{delay}+\tau] -$$

$$p^*[i]p[i+N_{delay}+\tau]$$

Figure 16:
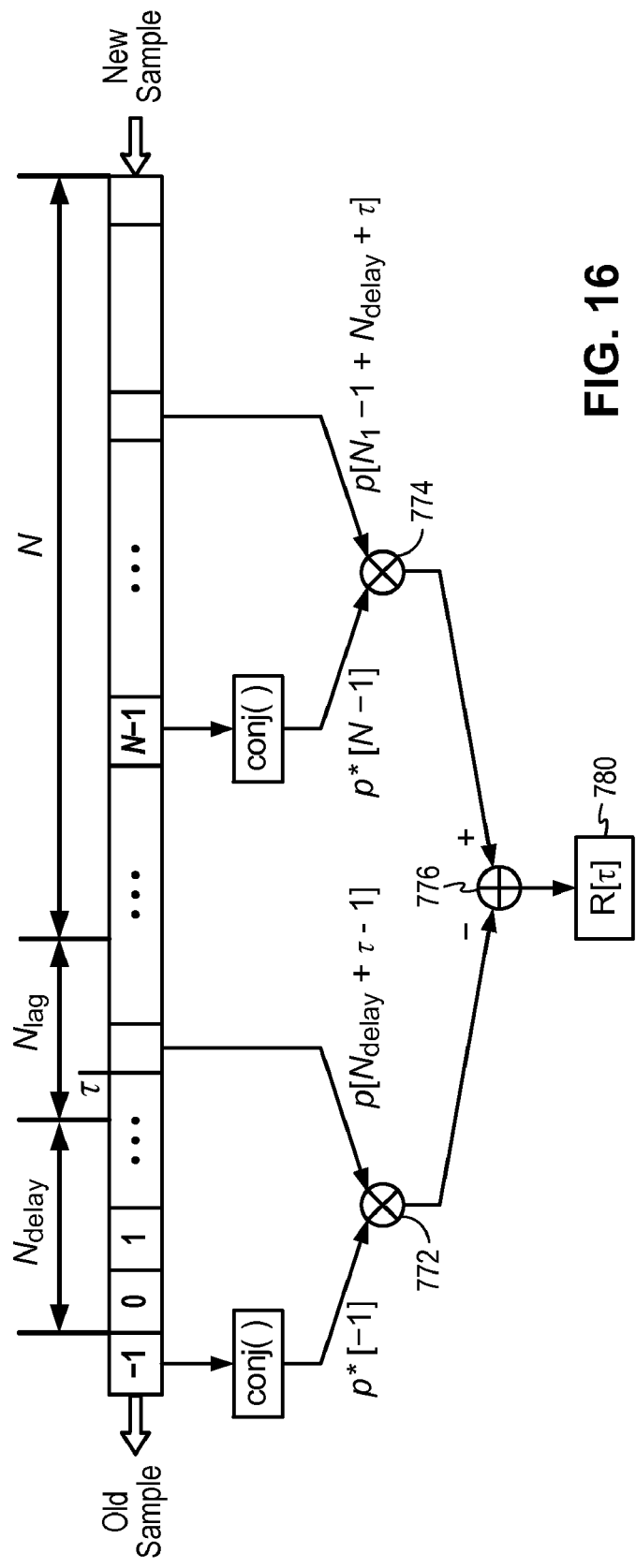
FIG. 16 illustrates the update operation for the correlation term R at lag τ according to one embodiment of the present invention.

As can be observed from the above equation, only two complex multiplications are required per lag per new sample instead of N multiplications required in the conventional computation. FIG. 16 illustrates the update operation for the correlation term $R[\tau]$ at lag $\tau$ according to one embodiment of the present invention. As shown in FIG. 16, a register 780, a complex register, is used to hold the correlation value $R[\tau]$ at each lag $\tau$ computed for a previous N samples. For each new sample, only two complex multiplications are performed per lag per new sample in order to obtain the updated correlation term $R[\tau]$. One complex multiplication (multiplier 772) is performed to compute the term for the obsolete sample and one complex multiplication (multiplier 774) is performed to compute the term for the new sample. The product based on the new sample is added to the stored sum and the product based on the obsolete sample is subtracted from the stored sum (summer 776) to generate the updated correlation value $R[\tau]$.

The normalization term (common to all lags) is updated in a similar fashion as the correlation value. More specifically, the normalization term $S_{i+1}$ is updated as follows:

$$S_{i+1} = \sum_{n=0}^{N-1} |p[n+i+1]|^2$$

$$= \sum_{n=0}^{N-1} |p[n+i]|^2 + |p[N+i]|^2 - |p[i]|^2$$

$$= S_i + |p[N+i]|^2 - |p[i]|^2.$$

Figure 17:
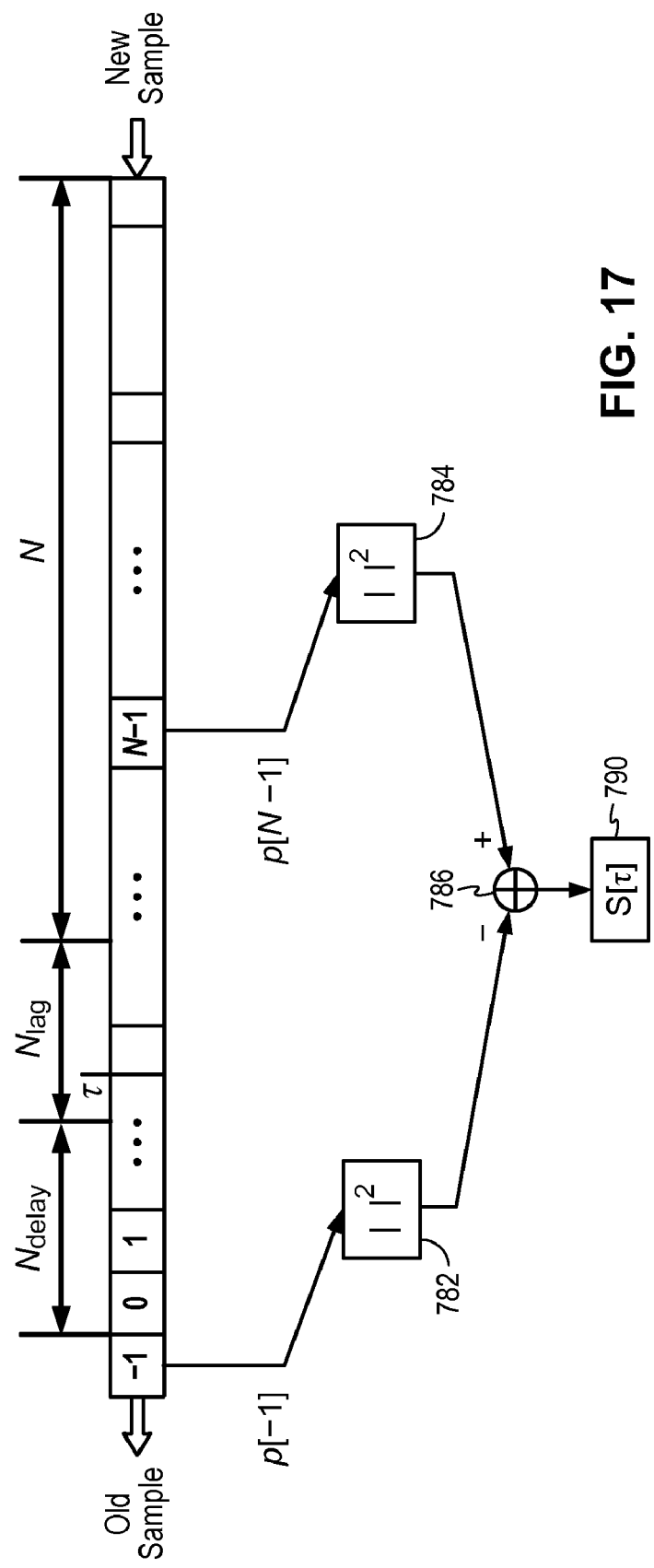
FIG. 17 illustrates the update operation for the normalization term Sat lag τ according to one embodiment of the present invention.

FIG. 17 illustrates the update operation for the normalization term S at lag $\tau$ according to one embodiment of the present invention. As shown in FIG. 17, a register 790 is used to hold the normalization value $S[\tau]$ at each lag $\tau$. All the multiplication terms from the previous time samples are computed and summed and stored in the register 790. When a new time sample is introduced, the normalization value S is computed by discarding the multiplication term of the obsolete sample which is the (N+1)th previous sample (multiplier 782) and adding the multiplication term of the new sample (multiplier 784) to the stored normalization value in register 790. As a result, only two multiplications are performed at each time sample—one for the new sample and one for the obsolete sample. The product based on the new sample is added to the stored sum and the product based on the obsolete sample is subtracted from the stored sum at summer 786 to generate the updated normalization value S.

The registers for storing values of R and S are updated at sample rate. However, the calculation of tap-specific gain control metric $g_t[\tau] = (R[\tau]/S)^2$, $\tau = 0, 1, L, N_{tap}-1$ and the corresponding gain adjustment are usually performed in a much slower pace than the sample rate.

5. Gain Adjustment Stepping Control

FIG. 13 above illustrates a repeater using a gain control metric calculator for monitoring and computing a gain control metric. The gain control metric then drives the gain control algorithm which controls the output gain of the repeater based at least in part on the gain control metric. According to embodiments of the present invention, the gain adjustment step size of the variable gain stage is a function of at least the loop gain of the repeater as measured by the gain control metric. In some embodiments, the gain adjustment step size of the variable gain stage is a function of the loop gain and the variable gain of the repeater. More specifically, in one embodiment, the loop gain of the repeater is divided into different operating zones and the gain adjustment step size is zone dependent. Finally, in another embodiment, the gain adjustment step size is a function of the gain control state, including the boot-up state and the steady state of the repeater operation.

Figure 18:
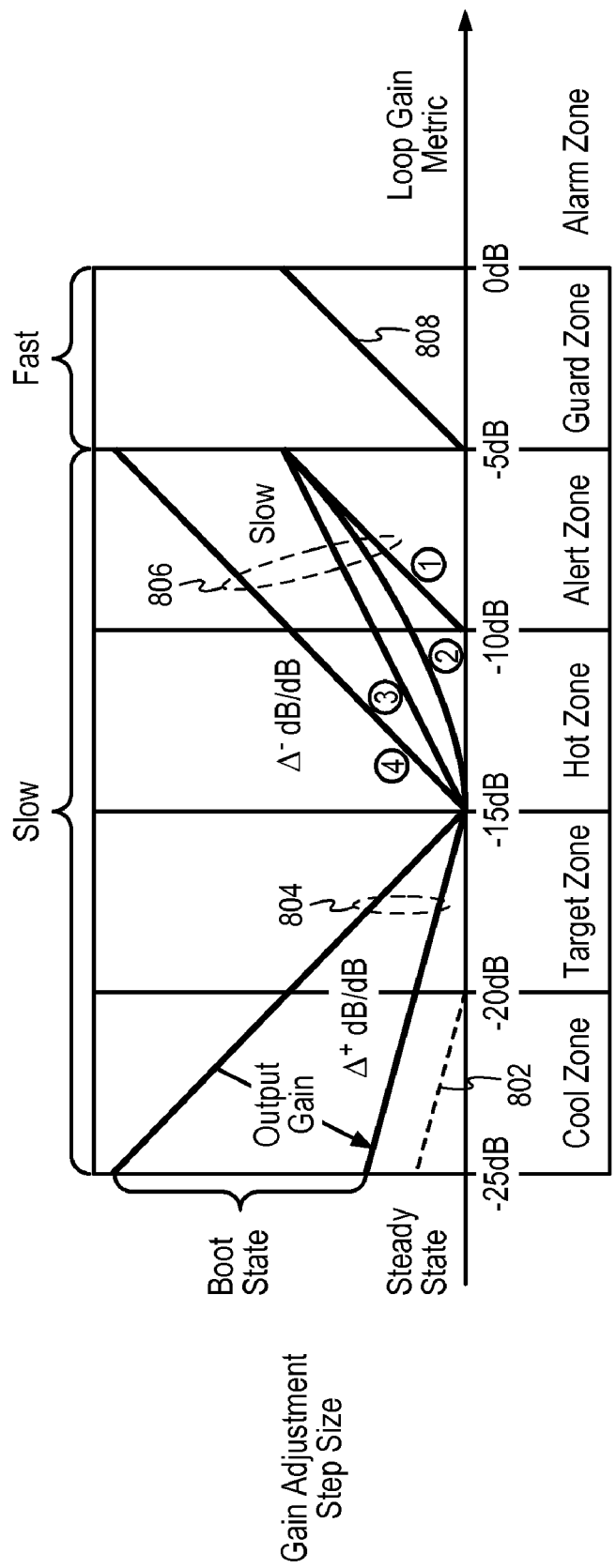
FIG. 18 is a diagram illustrating the gain adjustment control zones according to one embodiment of the present invention.

FIG. 18 is a diagram illustrating the gain adjustment control zones according to one embodiment of the present invention. Referring to FIG. 18, in steady state operation, the loop gain is in the cool zone (−20 dB to −25 dB) and the gain value does not vary very much due to the steady state operation. Thus, a gain adjustment control curve 802 having a small slope is used to provide a small gain adjustment step size. In the boot-up state, if the loop gain is in the target zone (−15 dB to −20 dB) or in the cool zone indicating stable operation, the rate of gain increase is a decreasing function of the total repeater output gain ($\Delta^+$ dB/dB). That is, the gain adjustment step size is a decreasing function of the repeater gain. The higher the repeater output gain, the smaller the gain adjustment step size or a small gain adjustment slope is used. This is because the higher the repeater output gain, the closer to instability the repeater is. Therefore, a smaller gain adjustment step size for increasing the gain is used when the gain is high. Curves 804 bond the area where the family of gain adjustment control curves resides. As the repeater output gain increases, gain adjustment curves with smaller slope is used.

In the hot zone (−10 dB to −15 dB) or the alert zone (−5 dB to −10 dB), the gain of the repeater decreases according to a selected one of gain adjustment control curves 806. Gain adjustment control curves 806 (curves 1-4) in the alert zone and hot zone illustrate the different gain adjustment stepping control that can be used to decrease the repeater gain when the gain value is in the hot or alert zone. More specifically, the rate of gain decrease is set as an increasing function of the total repeater output gain ($\Delta^+$ dB/dB). That is, the larger the repeater output gain, the closer to instability and thus a steep gain adjustment slope is used to decrease the gain rapidly in the hot or alert gain adjustment control zone. For instance, at low repeater gain levels, curve 1 having a piecewise linear slope is used where the gain is not adjusted when the loop gain is in the hot zone but when the loop gain increases to the alert zone, then the repeater gain is decreased according to the slope of curve 1. In one embodiment, curve 1 has a slope of −1 dB/dB. A non-linear stepping control can be used as shown by curve 2. When the repeater output gain is large, a steep slope for the gain adjustment step size is used as shown by curve 4 to rapidly decrease the gain.

Finally, if the loop gain is in the guard zone (0 dB to −5 dB), the repeater gain is decreased very rapidly (gain adjustment control curve 808) as the loop gain approaches instability. In the present embodiment, the gain adjustment control curve 808 thus has a steep linear slope. In other embodiments, the gain adjustment control curve 808 can have linear or non-linear slope and an appropriate slope value to provide the desired gain adjustment stepping control.

In one embodiment, the multi-metric gain control method described above is used to monitor the gain of the repeater to determine which of the gain adjustment control zones the repeater is operating in. More specifically, in one embodiment, a slow gain control metric is used to monitor the loop gain under −5 dB for improved accuracy and a fast gain control metric is used to monitor the loop gain above −5 dB for fast gain control response, as shown in FIG. 18. In other embodiments, the slow and fast gain control metric can be applied to other gain adjustment control zones, such as −15 dB.

Figure 19:
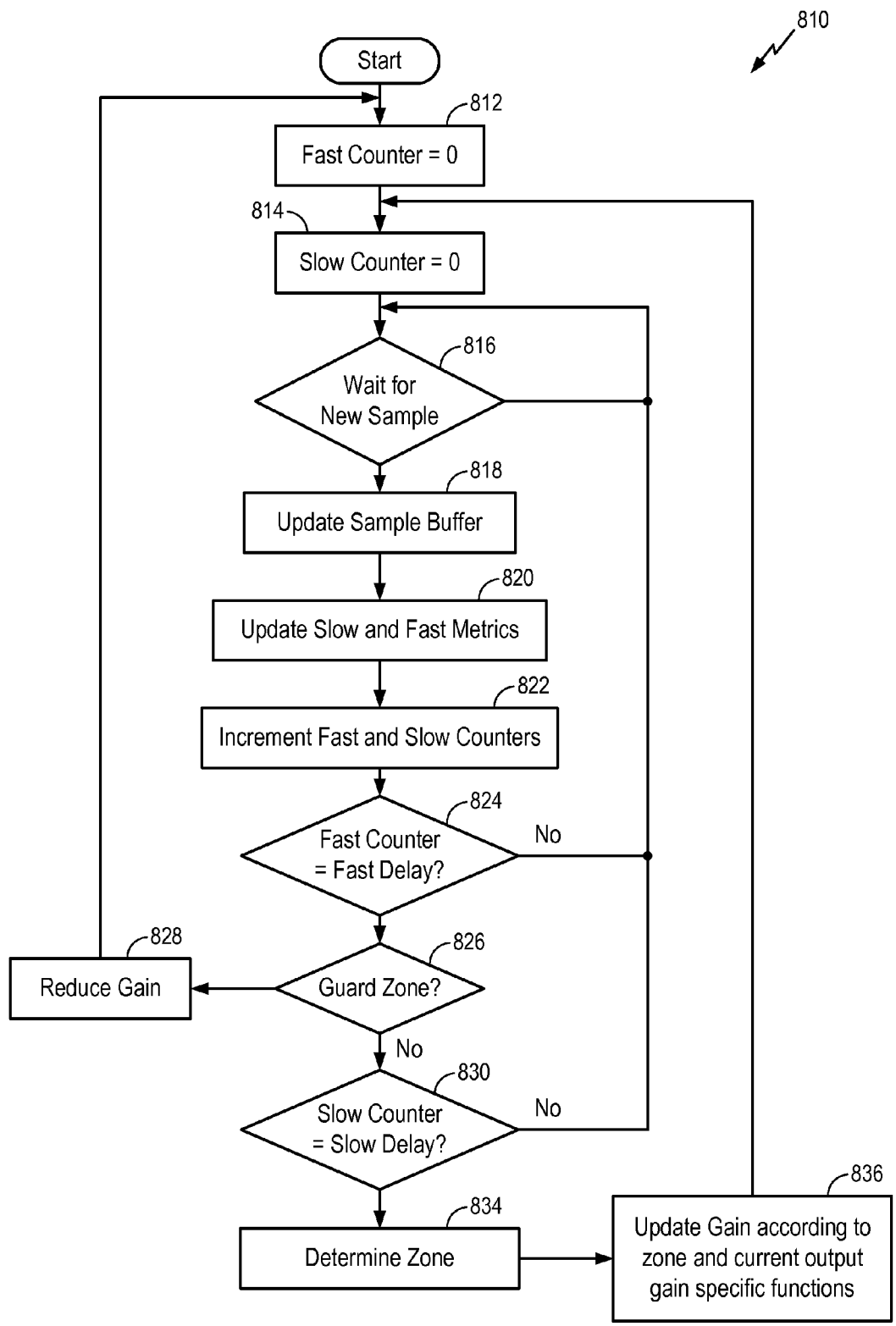
FIG. 19 is a flowchart illustrating the gain adjustment stepping control method as applied to the repeater of FIG. 6 implementing multiple metric gain control according to one embodiment of the present invention.

FIG. 19 is a flowchart illustrating the gain adjustment stepping control method as applied to the repeater of FIG. 6 implementing multiple metric gain control according to one embodiment of the present invention. Referring to FIG. 19, gain adjustment stepping control method 810 starts by setting a fast counter to 0 (step 812) and also setting a slow counter to 0 (step 814). Then, method 810 waits for a new sample (step 816). The sample buffer is updated (step 818) and the slow and fast gain control metrics are also updated based on the new sample (step 820). Then the fast and slow counters are incremented (step 822). If the fast counter does not equal to the Fast Delay value, (step 824), then method 810 returns to step 816 to wait for another new sample. If the fast counter is equal to the fast delay (step 824), then the fast gain control metric has finished integration. Method 810 proceeds to determine if the loop gain is in the guard zone of 0 to −5 dB (step 826) since the fast gain control metric is used to monitor the loop gain in the guard zone.

If the loop gain is in the guard zone, then method 810 reduces the gain of the repeater using curve 808 (step 828) and return to step 812 where the fast counter is reset. If the loop gain is not in the guard zone (step 826), then method 810 moves to determine if the slow gain control metric has finished integration by determining if the slow counter is equal to the slow delay (step 830). If the slow counter does not equal to the slow delay, then method 810 returns to step 816 for receiving another new sample. If the slow counter is equal to the slow delay, the slow gain control metric has completed integrated and method 810 determines the zone the loop gain is operating in (step 834). That is, method 810 determines if the loop gain is operating in the cool zone, the target zone, the hot zone or the alert zone. The repeater gain is then adjusted based on the operating zone and the current repeater output gain specific functions (step 836). Method 810 returns to step 814 where the slow counter is reset and the method continues.

In this manner, the gain adjustment stepping control method 810 updates the slow and fast gain control metrics, uses the fast metric to determine if the loop gain is in the guard zone and reduces the gain if the loop gain is in the guard zone. The gain control method further uses the slow metric to determine if the loop gain is in the other zones (cool, target, hot, and alert) and update the gain adjustment according to the zone and the current output gain specific functions. Fine tune gain control is thus realized.

6. Gain Control Metric Bias Removal

Gain control is essential for the safe boot up and stable operation of a repeater. Gain control metric is a quantity that a gain control algorithm uses for repeater gain adjustment. For instance, FIG. 13 illustrates a repeater using a gain control metric calculator for monitoring and computing a gain control metric and a gain control algorithm for controlling the repeater gain in response to the gain control metric. However, the gain control metric estimate is highly biased due to estimation noise. The presence of bias prevent gain control algorithm from accurately estimating the stability of the repeater.

As discussed above, the tap-specific gain control metric is given as:

$$g_i(\tau) = \frac{\left|\sum_{n=0}^{N-1} p^*[n+i]p[n+i+N_{delay}+\tau]\right|^2}{\sum_{n=0}^{N-1} |p[n+i]|^2} = |\eta_i(\tau)|^2$$

The gain metric bias results from the variance of the normalized correlation signal η. In one embodiment, the bias is expressed as:

$$\text{Bias}\{g_i(\tau)\} = \text{Var}\{\eta_i(\tau)\}$$

In particular, the variance results because of the squaring of the complex number η to obtain a real number. The gain control metric becomes highly biased as gain control metric estimation noise increases. More specifically, as discussed above, the gain control metric is a measure of the correlation between the transmitted signal and the received signal. A large correlation indicates a large amount of leakage and less stability. The gain control algorithm will respond to the gain control metric and lower the gain. A small correlation indicates a small feedback signal and increased stability. The gain control algorithm will respond to the gain control metric and increase the gain. However, even when there is no correlation, i.e., even when there is no feedback signal detected in the received signal, the squaring of the complex variable η will still give some value in real number. A bias in the gain control metric thus results.

According to one embodiment of the present invention and illustrated in FIG. 9, a bias estimator 590 is incorporated in the gain metric calculator to estimate the bias in the gain control metric. The variance of the gain control metric is estimated at each delay lag τ over time as a value δ as follows:

$$\delta = \sum_{\tau=1}^{N_{tap}} \left\{ \mathrm{var}_i \{\eta_i(\tau)\} \right\}.$$

Figure 20:
FIG. 20 illustrates the computation of the metric variance over delay lags and over time according to one embodiment of the present invention.

FIG. 20 illustrates the computation of the metric variance over delay lags and over time according to one embodiment of the present invention. The variance is computed for each delay lag and at each time sample, then the variance is added up to estimate the variance across the delay lags.

Once the bias value δ is computed, the bias δ is subtracted from the gain control metric as follows:

$$g_i = \sum_{\tau=1}^{N_{tap}} \{g_i(\tau)\} - \delta.$$

When the gain metric calculator uses multiple gain control metrics, the bias δ is subtracted from each of the gain control metrics.

7. Gain Control Metric Pruning

During the operation of a same frequency repeater, it is desirable to maintain stability in the repeater in the presence of large signal dynamics. Digital gain control may be used to maintain stability in a repeater. However, any gain control algorithm needs to be able to measure the stability margin, represented by the loop gain, so it can determine the appropriate gain to maintain stability. If there are large scale power swings in the remote signal, typical means of measuring the loop gain are susceptible to inaccuracy, and gain control may not function as desired.

According to one embodiment of the present invention, a gain control algorithm that is robust in the presence of large scale signal dynamics of the remote signal is described. More specifically, the gain control algorithm implements gain control metric pruning to discard gain control metrics, or at least parts of the gain control metrics, associated with large change in the signal dynamics of the remote signal. In this manner, the overall gain control metric values will not be corrupted due to abrupt changes in the power level of the receive signal and robust gain control is realized for achieving stability.

In one embodiment, the stability margin, as represented by the loop gain, in a repeater is determined by computing a correlation of the transmitted signal with the feedback signal. This quantity is normalized by the power of the transmitted signal in order to obtain an unbiased estimate of the loop gain. The expression for the loop gain estimation or the gain control metric is described above and repeated here. The gain control metric is characterized as a square of a correlation term $R_i$ in the numerator divided by a normalization term $S_i$ in the denominator, given as:

$$g[\tau] = (R_i[\tau]/S_i)^2 \quad \tau = 0, 1L, N_{tap} - 1.$$

However, if the power in the remote signal suddenly increases by a large amount, the correlation output will have a sudden jump, and at a later time, determined by the delay through the repeater, the transmitted signal will have a jump in energy. Because of this delay, for a short time the correlation energy normalized by the transmitted energy will be extremely high, indicating a large normalized correlation which in fact does not exist. As a result, a conventional gain control algorithm will keep the repeater gain abnormally low in the presence of large jumps in remote signal power. In other words, the gain control metric measurements become corrupted in the presence of large swings in the signal power of the remote signal and the gain control algorithm cannot function properly. The same corruption of the gain metric measurements would be observed for other forms of gain control metrics as typical gain control metrics include a correlation term.

Figure 21:
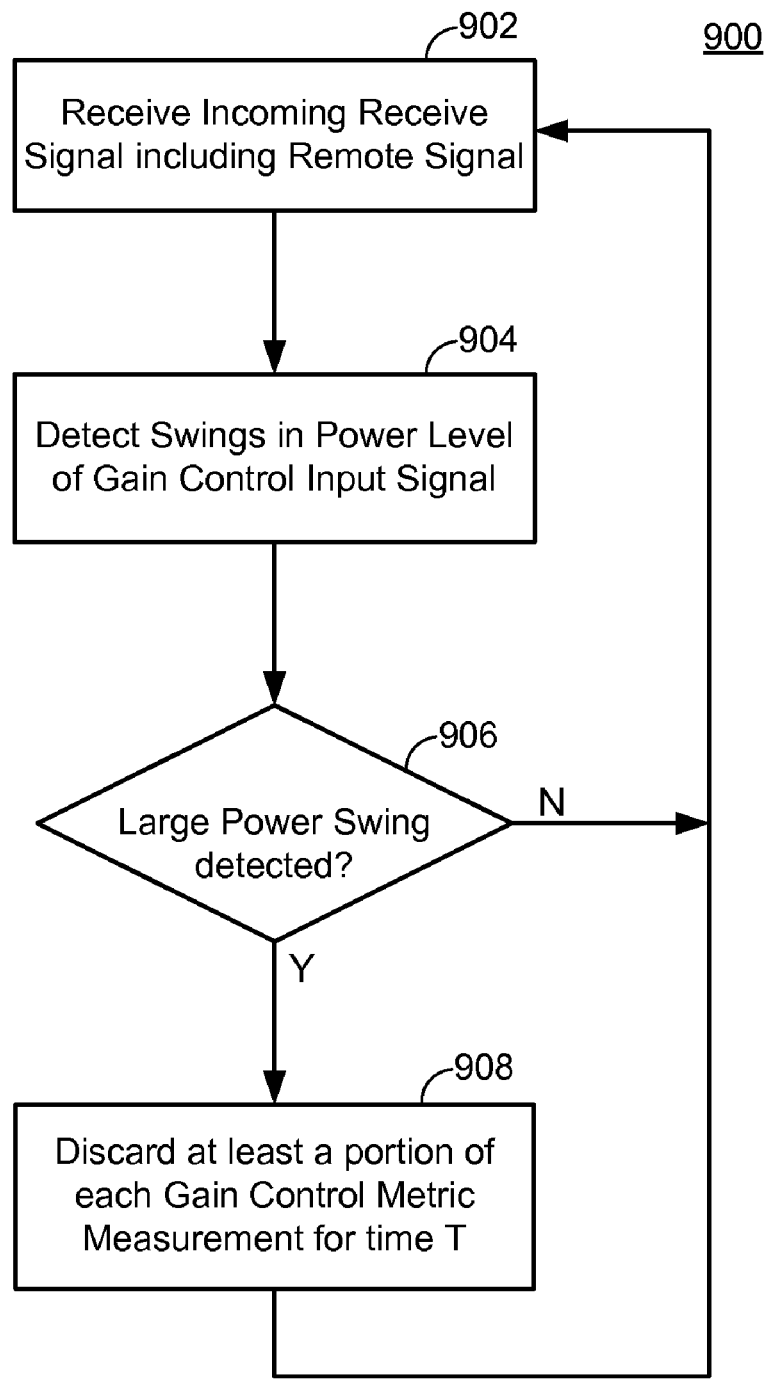
FIG. 21 is a flowchart illustrating the gain control metric pruning method implemented in a gain control algorithm according to one embodiment of the present invention.

FIG. 21 is a flowchart illustrating the gain control metric pruning method implemented in a gain control algorithm according to one embodiment of the present invention. The gain control metric pruning method of the present invention can be implemented in an echo cancellation repeater, such as the repeater shown in FIG. 13, or the method can be implemented in a repeater without echo cancellation, such as the repeater shown in FIG. 15. The gain control metric pruning method can be implemented in the gain metric calculator 660, 760 of the repeaters in FIGS. 13 and 15.

Referring to FIG. 21, a gain control metric pruning method 900 implemented in a gain control algorithm operates to disregard at least a portion of the gain control metric measurements for a short duration after a large jump in the power signal of the remote signal has been detected. Method 900 starts by receiving the incoming receive signal at a repeater which includes the remote signal (step 902). As described above, the receive signal is the sum of the remote signal and the feedback signal. A signal in the feedback loop of the repeater is used as the gain control input signal where samples of the gain control input signal are used to compute the gain control metric. The gain control input signal can be taken from any point in the repeater feedback loop, including before echo cancellation or after echo cancellation, or any point in the repeater feedback loop without echo cancellation. Then, swings in the power level of the gain control input signal are detected to determine if there are large power swings in the signal (step 904). The swings in the power level of the gain control input signal can be detected directly from the gain control input signal or it can be detected indirectly through measurements of other signals having a power level response corresponding to the gain control input signal. In one embodiment, power swings are detected by measuring the power swing in the receive signal. In other embodiments, swings in the gain control input signal is detected by using an FIR (finite impulse response) or IIR (infinite impulse response) filter. When no large power swings are detected in the gain control input signal (step 906), method 900 returns to step 902 to continue to receive the incoming receive signal. However, when a large power swing, such as a power swing of 9 dB or greater, is detected (step 906), gain control metric measurements, or at least a portion of each gain control metric measurement, are discarded for a time period of T (step 908). In one embodiment, the correlation measurements $R_i$ of the gain control metric measurements are discarded for the time period of T. The duration T over which portions of gain control metric measurements are disregarded is short enough (on the order of 10 μs) such that the ability to detect possible instabilities in normal repeater operation is not impeded. Method 900 than returns to step 902 to continue to receive incoming receive signal.

Figure 22:
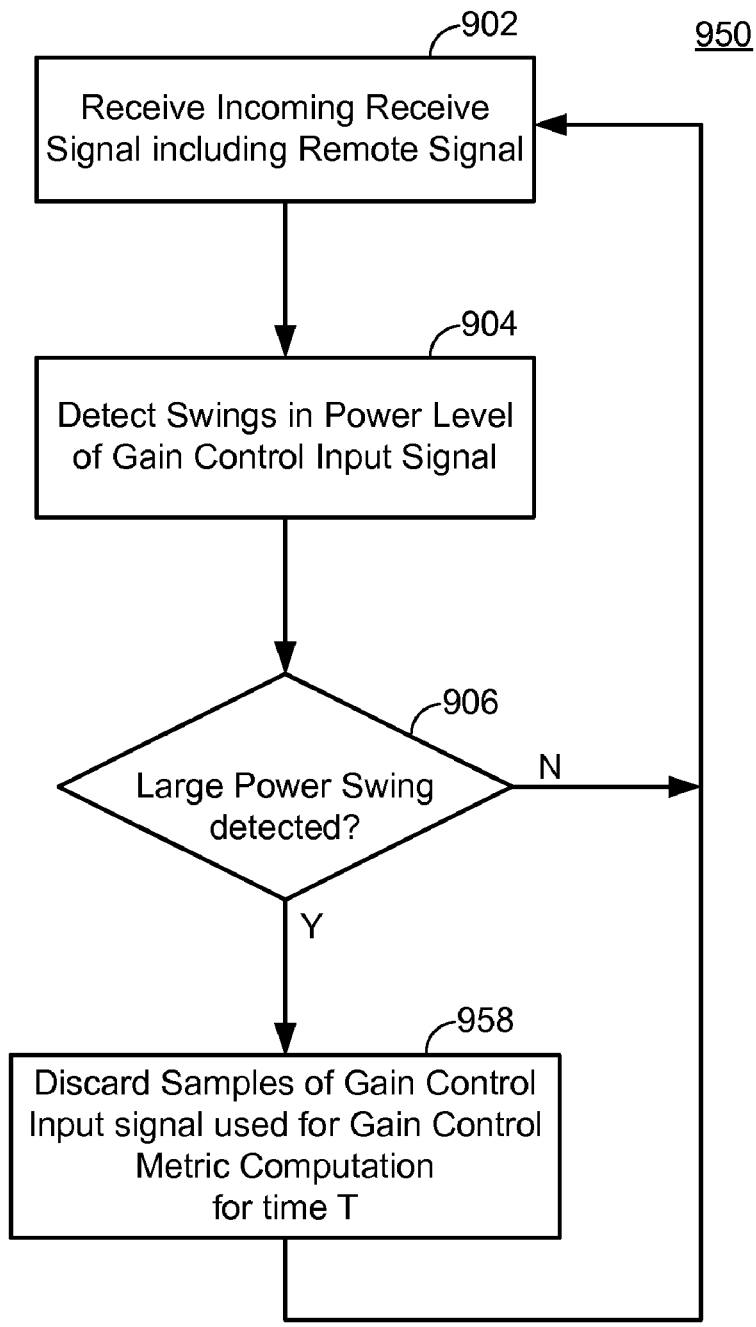
FIG. 22 is a flowchart illustrating the gain control metric pruning method implemented in a gain control algorithm according to an alternate embodiment of the present invention.

FIG. 22 is a flowchart illustrating the gain control metric pruning method implemented in a gain control algorithm according to an alternate embodiment of the present invention. Method 950 in FIG. 22 is similar to method 900 in FIG. 21 and like elements are given like reference numerals to simplify the discussion. Referring to FIG. 22, in gain control metric pruning method 950, the gain control metric pruning method operates to discard samples of the gain control input signal used for the gain control metric computation for a short duration T after a large jump in remote signal power has been detected (step 958). In this manner, samples of the gain control input signal associated with swings in the remote signal power are discarded before the samples corrupt the gain control metric measurements.

The advantage of using gain control metric pruning in accordance is that a gain control algorithm for an on-frequency repeater can run robustly in the presence of large scale signal dynamics of the remote signal. It is crucial to implement a gain control algorithm to ensure stability. If gain control metric pruning were not implemented, then gain control would not allow the gain to ramp up in the presence of large swings in signal power, and the repeater maybe completely dysfunctional under such circumstances. However, when the gain control metric pruning method of the present invention is implemented, the gain control algorithm is able to control the gain of the repeater in the presence of large swings in the signal power of the remote signal to allow the repeater to respond effectively to changing conditions of the remote signal Those skilled in the art will understand that information and signals may be represented using any of a variety of different technologies and techniques. For example: data, information, signals, bits, symbols, chips, instructions, and commands may be referenced throughout the above description. These may be represented by voltages, currents, electromagnetic waves, magnetic fields or particles, optical fields or particles, or any combination thereof.

In one or more exemplary embodiments, the functions and processes described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The term "control logic" used herein applies to software (in which functionality is implemented by instructions stored on a machine-readable medium to be executed using a processor), hardware (in which functionality is implemented using circuitry (such as logic gates), where the circuitry is configured to provide particular output for particular input, and firmware (in which functionality is implemented using re-programmable circuitry), and also applies to combinations of one or more of software, hardware, and firmware.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a memory, for example the memory of mobile station or a repeater, and executed by a processor, for example the microprocessor of modem. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

Also, computer instructions/code may be transmitted via signals over physical transmission media from a transmitter to a receiver. For example, if the software is transmitted from a website, server, or other remote source using a coaxial cable, fiber optic cable, twisted pair, digital subscriber line (DSL), or physical components of wireless technologies such as infrared, radio, and microwave. Combinations of the above should also be included within the scope of physical transmission media.

Moreover, the previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the features shown herein but is to be accorded the widest scope consistent with the principles and novel features disclosed herein.

What is claimed is:

1. A method for controlling gain in a wireless repeater having a receiving antenna and a transmitting antenna, the method comprising:
  receiving an input signal at the receiving antenna, the input signal being a sum of a remote signal to be repeated and a feedback signal resulting from a feedback channel between the receiving antenna and the transmitting antenna;
  transmitting an output signal on the transmitting antenna, the output signal being an amplified input signal;
  measuring one or more gain control metrics to determine a loop gain of the feedback channel between the receiving antenna and the transmitting antenna; and
  adjusting a variable gain of the repeater using a gain adjustment step size, the gain adjustment step size being a function of at least the loop gain of the feedback channel as determined from the one or more gain control metrics.

2. The method of claim 1, the gain adjustment step size further being a function of the variable gain of the repeater.

3. A method for controlling gain in a wireless repeater having a receiving antenna and a transmitting antenna, the method comprising:
  receiving an input signal at the receiving antenna, the input signal being a sum of a remote signal to be repeated and a feedback signal resulting from a feedback channel between the receiving antenna and the transmitting antenna;

transmitting an output signal on the transmitting antenna, the output signal being an amplified input signal;

measuring one or more gain control metrics to determine a loop gain of the repeater; and dividing the loop gain of the repeater into a plurality of gain adjustment control zones that include a first zone having a loop gain in a stable operating region and a second zone having a loop gain outside the stable operating region;

providing one or more gain adjustment control curves in the plurality of gain adjustment control zones, wherein the one or more gain adjustment control curves are provided in the first zone to increase a variable gain of the repeater and provided in the second zone to decrease the variable gain of the repeater;

determining one of the plurality of gain adjustment control zones in which the repeater is operating using the one or more gain control metrics; and adjusting the variable gain of the repeater using a gain adjustment step size, the gain adjustment step size being a function of the loop gain of the repeater as determined from the one or more gain control metrics and the one or more gain adjustment control curves provided in the determined one of the plurality of gain adjustment control zones.

4. The method of claim 3, wherein the loop gain associated with the second zone is near an unstable operating region and the plurality of gain adjustment control zones further include a third zone between the first zone and the second zone; and wherein the one or more gain adjustment control curves are further provided in the second zone to rapidly decrease the variable gain of the repeater and provided in the third zone to decrease the variable gain of the repeater.

5. The method of claim 4, wherein:
the one or more gain adjustment control curves provided in the third zone have gain adjustment step sizes that increase as a function of the variable gain of the repeater, whereby as the variable gain of the repeater increases, a slope of the one or more gain adjustment control curves provided in the third zone increases.

6. The method of claim 4, wherein the one or more gain adjustment control curves provided in the third zone have one or more of a non-linear slope, a piecewise-linear slope, or a linear slope.

7. The method of claim 3, further comprising:
applying the one or more gain adjustment control curves provided in the first zone to increase the variable gain of the repeater when the repeater is operating in a steady state, wherein the one or more gain adjustment control curves provided in the first zone have a small slope to increase the variable gain of the repeater in small gain adjustment step sizes.

8. The method of claim 3, further comprising:
applying the one or more gain adjustment control curves provided in the first zone to increase the variable gain of the repeater when the repeater is operating in a boot-up state, the one or more gain adjustment control curves provided in the first zone having gain adjustment step sizes that decrease as a function of the variable gain of the repeater, whereby as the variable gain of the repeater increases, a slope of the one or more gain adjustment control curves applied in the first zone decreases.

9. The method of claim 3, wherein:
the one or more gain adjustment control curves provided in the second zone have a large slope to decrease the variable gain of the repeater in large gain adjustment step sizes.

10. The method of claim 3, wherein determining the one of the plurality of gain adjustment control zone in which the repeater is operating using the one or more gain control metrics comprises:
using a first gain control metric having a short integration length to determine if the repeater is operating in the second zone of the plurality of gain adjustment control zones; and
using a second gain control metric having a long integration length to determine if the repeater is operating in the first zone of the plurality of gain adjustment control zones.

11. The method of claim 3, where in the first zone is associated with a loop gain of about −15 dB or less the second zone is associated with a loop gain of 0 dB to −15 dB.

12. A wireless repeater having a receiving antenna for receiving an input signal and a transmitting antenna for transmitting an output signal, the input signal being a sum of a remote signal to be repeated and a feedback signal resulting from a feedback channel between the receiving antenna and the transmitting antenna, the output signal being an amplified input signal, the repeater comprising:
a gain control block configured to control a variable gain value of the repeater based on one or more gain control metrics, the gain control metrics being indicative of a loop gain of the feedback channel between the receiving antenna and the transmitting antenna, the gain control block comprising a gain metric calculator configured to measure the one or more gain control metrics to determine the loop gain of the feedback channel and a gain control algorithm block configured to control the variable gain of the repeater based on the one or more measured gain control metrics,
wherein the gain control algorithm block is configured to adjust the variable gain of the repeater using a gain adjustment step size, the gain adjustment step size being a function of at least the loop gain of the feedback channel as determined from the one or more measured gain control metrics.

13. The wireless repeater of claim 12, the gain adjustment step size further being a function of the variable gain of the repeater.

14. A wireless repeater having a receiving antenna for receiving an input signal and a transmitting antenna for transmitting an output signal, the input signal being a sum of a remote signal to be repeated and a feedback signal resulting from a feedback channel between the receiving antenna and the transmitting antenna, the output signal being an amplified input signal, wherein the repeater comprises:
a gain metric calculator configured to measure one or more gain control metrics to determine a loop gain of the repeater; and
a gain control algorithm block configured to:
divide the loop gain of the repeater into a plurality of gain adjustment control zones that include a first zone having a loop gain in a stable operating region and a second zone having a loop gain outside the stable operating region;
provide one or more gain adjustment control curves in the plurality of gain adjustment control zones, wherein the one or more gain adjustment control curves are provided in the first zone to increase variable gain of the repeater and provided in the second zone to decrease the variable gain of the repeater;
determine one of the plurality of gain adjustment control zones in which the repeater is operating using the one or more gain control metrics; and adjust the variable gain of the repeater using a gain adjustment step size, the gain adjustment step size being a function of the loop gain of the repeater as determined from the one or more gain control metrics and the one or more gain adjustment control curves provided in the determined one of the plurality of gain adjustment control zones.

15. The wireless repeater of claim 14, wherein the loop gain associated with the second zone is near an unstable operating region and the plurality of gain adjustment control zones further include a third zone between the first zone and the second zone; and wherein the one or more gain adjustment control curves are further provided in the second zone to rapidly decrease the variable gain of the repeater and provided in the third zone to decrease the variable gain of the repeater.

16. The wireless repeater of claim 15, wherein the one or more gain adjustment control curves provided in the third zone have gain adjustment step sizes that increase as a function of the variable gain of the repeater, the larger the variable gain of the repeater, whereby as the variable gain of the repeater increases, a slope of the one or more gain adjustment control curves provided in the third zone increases.

17. The wireless repeater of claim 15, wherein the one or more gain adjustment control curves provided in the third zone have one or more of a non-linear slope, a piecewise-linear slope, or a linear slope.

18. The wireless repeater of claim 14, wherein the gain control algorithm block is further configured to apply the one or more gain adjustment control curves provided in the first zone to increase the variable gain of the repeater when the repeater is operating in a steady state, the one or more gain adjustment control curves provided in the first zone having a small slope to increase the variable gain of the repeater in small gain adjustment step sizes.

19. The wireless repeater of claim 14, wherein the gain control algorithm block is further configured to apply the one or more gain adjustment control curves provided in the first zone to increase the variable gain of the repeater when the repeater is operating in a boot-up state, the one or more gain adjustment control curves provided in the first zone having gain adjustment step sizes that decrease as a function of the variable gain of the repeater, whereby as the variable gain of the repeater increases, a slope of the one or more gain adjustment control curves applied in the first zone decreases.

20. The wireless repeater of claim 14, wherein the one or more gain adjustment control curves provided in the second zone have a large slope to decrease the variable gain of the repeater in large gain adjustment step sizes.

21. The wireless repeater of claim 14, wherein to determine the one of the plurality of gain adjustment control zone in which the repeater is operating using the one or more gain control metrics, the gain control algorithm block is further configured to:
use a first gain control metric having a short integration length to determine if the repeater is operating in the second zone of the plurality of gain adjustment control zones; and
use a second gain control metric having a long integration length to determine if the repeater is operating in the first zone of the plurality of gain adjustment control zones.

22. The wireless repeater of claim 14, where in the first zone is associated with a loop gain of about −15 dB or less the second zone is associated with a loop gain of 0 dB to −15 dB.

23. An apparatus for controlling gain in a wireless repeater having a receiving antenna and a transmitting antenna, wherein the apparatus comprises:

means for measuring one or more gain control metrics to determine a loop gain of a feedback channel between the receiving antenna and the transmitting antenna; and
means for adjusting a variable gain of the repeater using a gain adjustment step size, the gain adjustment step size being a function of at least the loop gain of the feedback channel as determined from the one or more gain control metrics.

24. A non-transitory computer-readable medium comprising instructions for controlling gain in a wireless repeater having a receiving antenna and a transmitting antenna, wherein executing the instructions on a machine causes the machine to:
measure one or more gain control metrics to determine a loop gain of a feedback channel between the receiving antenna and the transmitting antenna; and
adjust a variable gain of the repeater using a gain adjustment step size, the gain adjustment step size being a function of at least the loop gain of the feedback channel as determined from the one or more gain control metrics.

25. An apparatus for controlling gain in a wireless repeater having a receiving antenna and a transmitting antenna, wherein the apparatus comprises:
means for measuring one or more gain control metrics to determine a loop gain of a feedback channel between the receiving antenna and the transmitting antenna;
means for dividing the loop gain of the feedback channel into a plurality of gain adjustment control zones that include a first zone having a loop gain in a stable operating region and a second zone having a loop gain outside the stable operating region;
means for providing one or more gain adjustment control curves in the plurality of gain adjustment control zones, wherein the one or more gain adjustment control curves are provided in the first zone to increase a variable gain of the repeater and provided in the second zone to decrease the variable gain of the repeater;
means for determining one of the plurality of gain adjustment control zones in which the repeater is operating using the one or more gain control metrics; and
means for adjusting the variable gain of the repeater using a gain adjustment step size, the gain adjustment step size being a function of the loop gain of the feedback channel as determined from the one or more gain control metrics and the one or more gain adjustment control curves provided in the determined one of the plurality of gain adjustment control zones.

26. A non-transitory computer-readable medium comprising instructions for controlling gain in a wireless repeater having a receiving antenna and a transmitting antenna, wherein executing the instructions on a machine causes the machine to:
measure one or more gain control metrics to determine a loop gain of a feedback channel between the receiving antenna and the transmitting antenna;
divide the loop gain of the feedback channel into a plurality of gain adjustment control zones that include a first zone having a loop gain in a stable operating region and a second zone having a loop gain outside the stable operating region;
provide one or more gain adjustment control curves in the plurality of gain adjustment control zones, wherein the one or more gain adjustment control curves are provided in the first zone to increase a variable gain of the repeater and provided in the second zone to decrease the variable gain of the repeater;

determine one of the plurality of gain adjustment control zones in which the repeater is operating using the one or more gain control metrics; and adjust the variable gain of the repeater using a gain adjustment step size, the gain adjustment step size being a function of the loop gain of the feedback channel as determined from the one or more gain control metrics and the one or more gain adjustment control curves provided in the determined one of the plurality of gain adjustment control zones.

* * * * *